(12) United States Patent
Boothby et al.

(10) Patent No.: US 6,212,529 B1
(45) Date of Patent: *Apr. 3, 2001

(54) SYNCHRONIZATION OF DATABASES USING FILTERS

(75) Inventors: David J. Boothby, Nashua; David W. Morgan, Derry; John R. Marien, Nashua, all of NH (US)

(73) Assignee: Puma Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/036,400

(22) Filed: Mar. 5, 1998

Related U.S. Application Data

(63) Continuation-in-part of application No. 08/748,645, filed on Nov. 13, 1996.

(51) Int. Cl.[7] ............................. G06F 17/30; G06F 12/00
(52) U.S. Cl. ............................................. 707/201; 707/10
(58) Field of Search ............................. 707/10, 201, 202, 707/204, 203

(56) References Cited

U.S. PATENT DOCUMENTS

| | | | |
|---|---|---|---|
| 4,432,057 | 2/1984 | Daniell et al. | 395/608 |
| 4,807,182 | 2/1989 | Queen | 395/144 |
| 4,819,156 | 4/1989 | DeLorme et al. | 364/200 |
| 4,827,423 | 5/1989 | Beasley et al. | 364/468 |
| 4,866,611 | 9/1989 | Cree et al. | 395/600 |
| 4,875,159 | 10/1989 | Cary et al. | 395/619 |
| 4,956,809 | 9/1990 | George et al. | 395/601 |
| 4,980,844 | 12/1990 | Demjanenko et al. | 364/550 |
| 5,065,360 | 11/1991 | Kelly | 395/800 |
| 5,136,707 | 8/1992 | Block et al. | 395/600 |
| 5,142,619 | 8/1992 | Webster, III | 395/161 |
| 5,155,850 | * 10/1992 | Janis et al. | 707/202 |
| 5,170,480 | 12/1992 | Mohan et al. | 395/600 |
| 5,187,787 | 2/1993 | Skeen et al. | 395/600 |
| 5,210,868 | 5/1993 | Shimada et al. | 395/615 |
| 5,228,116 | 7/1993 | Harris et al. | 395/54 |
| 5,237,678 | 8/1993 | Kuechler et al. | 395/600 |
| 5,251,151 | 10/1993 | Demjanenko et al. | 364/550 |
| 5,251,291 | 10/1993 | Malcolm | 395/161 |
| 5,261,045 | 11/1993 | Scully et al. | 395/161 |
| 5,261,094 | 11/1993 | Everson et al. | 395/617 |
| 5,272,628 | 12/1993 | Koss | 364/419.19 |
| 5,278,978 | 1/1994 | Demers et al. | 395/600 |

(List continued on next page.)

OTHER PUBLICATIONS

U.S. application No. 08/927,922, filed Sep. 11, 1997.
U.S. application No. 08/964,51, filed Nov. 5, 1997.
Alfieri, "The Best of WordPerfect Version 5.0," Hayden Books, pp. 153–165, 429–435 (1988).
"Automatically Synchronized Objects," Research Disclosure #29261, p. 614 (Aug. 1988).

(List continued on next page.)

*Primary Examiner*—Thomas G. Black
*Assistant Examiner*—Frantz Coby
(74) *Attorney, Agent, or Firm*—Fish & Richardson P.C.

(57) ABSTRACT

A computer program is provided for synchronizing at least a first and a second database. A plurality of records of the first database fitting a selected criterion are identified. At least one of the identified records of the first database is then synchronized with a record of the second database. On a computer display, a record selection criteria displayed for a user to input the selected criterion.

52 Claims, 16 Drawing Sheets

Microfiche Appendix Included
(11 Microfiche, 1024 Pages)

U.S. PATENT DOCUMENTS

| | | | |
|---|---|---|---|
| 5,278,982 * | 1/1994 | Daniels et al. | 707/202 |
| 5,283,887 | 2/1994 | Zachery | 359/500 |
| 5,293,627 | 3/1994 | Kato et al. | 395/550 |
| 5,301,313 | 4/1994 | Terada et al. | 395/600 |
| 5,315,709 | 5/1994 | Alston, Jr. et al. | 395/606 |
| 5,327,555 | 7/1994 | Anderson | 395/617 |
| 5,333,252 | 7/1994 | Brewer, III et al. | 395/767 |
| 5,333,265 | 7/1994 | Orimo et al. | 395/200 |
| 5,333,316 | 7/1994 | Champagne et al. | 395/600 |
| 5,339,392 | 8/1994 | Risberg et al. | 395/161 |
| 5,339,434 | 8/1994 | Rusis | 395/700 |
| 5,355,476 | 10/1994 | Fukumura | 395/600 |
| 5,375,234 | 12/1994 | Davidson et al. | 395/600 |
| 5,392,390 | 2/1995 | Crozier | 395/335 |
| 5,396,612 | 3/1995 | Huh et al. | 395/575 |
| 5,434,994 | 7/1995 | Shaheen et al. | 395/617 |
| 5,444,851 | 8/1995 | Woest | 395/200.1 |
| 5,463,735 | 10/1995 | Pascucci et al. | 395/200.1 |
| 5,475,833 | 12/1995 | Dauerer et al. | 395/617 |
| 5,511,188 | 4/1996 | Pascucci et al. | 395/600 |
| 5,519,606 | 5/1996 | Frid-Nielsen et al. | 395/228 |
| 5,560,005 | 9/1996 | Hoover et al. | 395/600 |
| 5,568,402 | 10/1996 | Gray et al. | 364/514 C |
| 5,583,793 | 12/1996 | Gray et al. | 364/514 C |
| 5,600,834 | 2/1997 | Howard | 395/617 |
| 5,613,113 * | 3/1997 | Goldring | 707/202 |
| 5,615,364 | 3/1997 | Marks | 395/618 |
| 5,619,689 | 4/1997 | Kelly | 395/617 |
| 5,630,081 | 5/1997 | Rybicki et al. | 395/948 |
| 5,666,530 | 9/1997 | Clark et al. | 395/617 |
| 5,666,553 | 9/1997 | Crozier | 395/803 |
| 5,682,524 | 10/1997 | Freund et al. | 395/605 |
| 5,684,984 | 11/1997 | Jones et al. | 395/610 |
| 5,684,990 | 11/1997 | Boothby | 395/619 |
| 5,701,423 | 12/1997 | Crozier | 395/335 |
| 5,708,812 | 1/1998 | Van Dyke et al. | 395/712 |
| 5,708,840 | 1/1998 | Kikinis et al. | 395/800 |
| 5,710,922 | 1/1998 | Alley et al. | 395/617 |
| 5,727,202 | 3/1998 | Kucala | 395/610 |
| 5,729,735 | 3/1998 | Meyering | 395/610 |
| 5,745,712 | 4/1998 | Turpin et al. | 395/333 |
| 5,758,083 * | 5/1998 | Singh et al. | 707/10 |
| 5,758,150 | 5/1998 | Bell et al. | 395/610 |
| 5,758,355 | 5/1998 | Buchanan | 707/201 |
| 5,778,388 | 7/1998 | Kawamura et al. | 707/203 |
| 5,790,789 | 8/1998 | Suarez | 395/200.32 |
| 5,845,293 | 12/1998 | Veghte et al. | 707/202 |
| 5,870,759 * | 2/1999 | Bauer et al. | 707/201 |
| 5,870,765 * | 2/1999 | Bauer et al. | 707/203 |
| 5,878,415 * | 3/1999 | Olds | 707/9 |
| 5,884,323 | 3/1999 | Hawkins et al. | 707/201 |
| 5,884,324 | 3/1999 | Cheng et al. | 707/201 |
| 5,884,325 * | 3/1999 | Bauer et al. | 707/201 |
| 5,897,640 | 4/1999 | Veghte et al. | 707/202 |
| 5,926,824 | 7/1999 | Hashimoto et al. | 707/520 |
| 5,978,813 | 11/1999 | Foltz et al. | 707/201 |

OTHER PUBLICATIONS

Cobb et al., "Paradox 3.5 Handbook 3rd Edition," Bantam, pp. 803–816 (1991).

"FRx Extends Reporting Power of Platinum Series: (IBM Desktop Software's Line of Accounting Software)," Doug Dayton, PC Week, v. 8, n. 5, p. 29(2) (Feb. 4, 1991).

IntelliLink Brochure (1990).

"Logical Connectivity: Applications, Requirements, Architecture, and Research Agenda," Stuart Madnick & Y. Richard Wang, MIT, Systems Sciences, 1991 Hawaii Int'l, vol. 1, IEEE (Jun. 1991).

"Open Network Computing—Technical Overview," Sun Technical Report, Microsystems, Inc., pp. 1–32 (1987).

Organizer Link II Operation Manual, Sharp Electronics Corporation.

Bishop et al., "The Big Picture (Accessing Information on Remote Data Management System," UNIX Review, v. 7, n. 8, p. 38(7) (Aug. 1989).

User Manual for Connectivity Pack for the HP 95LX, Hewlett Packard Company (1991).

User Manual for PC–Link for the B.O.S.S. and the PC–Link for the B.O.S.S., Traveling Software, Inc. (1989).

Zahn et al., *Network Computing Architecture*, pp. 1–11; 19–31; 87=115; 117–133; 187–199;201–209 (1990).

U.S. application No. 08/749926, filed Nov. 13, 1996.

U.S. application No. 08/752,490, filed Nov. 13, 1996.

U.S. application No. 08/748,645, filed Nov. 13, 1996.

Chapura, Inc., *3 Compare*, http://www.chapura.com/3compare.html (1997).

Chapura, Inc., *PilotMirror Features Page*, http://www.chapura.com/features.html (1997).

Wiederhold et al., Consistency Control of Replicated Data in Federated Databases, IEEE, pp. 130–132, Nov. 1990.*

Bowen et al., Achieving Throughput and Functionality in a Common Architecture: The DataCycle Experiment, IEEE, p. 178, Dec. 1991.*

* cited by examiner

Pseudo Code for Translation Engine Control Module

100. INSTRUCT parameter table generator to create parameter table and initialize filter
101. INSTRUCT Synchronizer to initialize itself
102. INSTRUCT Synchronizer to LOAD the History_File into its WORKSPACE
103. INSTRUCT R_Translator to LOAD R_records from R_Database
104. INSTRUCT L_Translator to SANITIZE R_records that were just LOADED
105. INSTRUCT L_Translator to LOAD L_Records from L_Database and SEND to Synchronizer
106. INSTRUCT R_Translator to SANITIZE L_Records that were just LOADED.
107. INSTRUCT Synchronizer to do CAAR (Conflict Analysis And Resolution) on all the records in WORKSPACE.
108. INFORM user exactly what steps Synchronizer proposes to take (i.e. Adding, Changing, and Deleting records). WAIT for User.
109. IF User inputs NO, then ABORT.
110. INSTRUCT R_Translator to UNLOAD all applicable records to R_Database.
111. INSTRUCT L_Translator to UNLOAD all applicable records to L_Database.
112. INSTRUCT Synchronizer to CREATE a new History File.

FIG. 4

Pseudocode for Generating Parameter Table

{Get Input from the user}
150.  ASK user to select whether to use a filter expression
151.  IF the user selected to use a filter THEN
152.    IF a new filter to be used THEN
153.      Obtain from the user filter name
154.      Obtain filter expression
155.      STORE the current date and time in the FILTER_CHANGED_TIMESTAMP parameter
156.      Assign a unique filter ID to the filter
157.    ELSE Obtain from the user filter name
158.      retrieve the filter expression and unique filter ID
159.      IF user selects to edit the filter THEN display the filter and obtain edits
160.    SET FILTER_ID parameter to unique filter ID code of the selected filter
161.    SET USE_FILTER flag
162.    PARSE the filter expression into a filter token array
163.  END IF
164.  CREATE parameter table

FIG. 5

*Filter language specification*

*Expression* = *Condition1* [*AND Condition2*] ... [*OR Condition3*] ...

*Condition* = *ARG1 OP ARG2*

*OP* = *OP_SET_1* | *OP_SET_2* | *OP_SET_3* | *OP_SET_4* | *OP_SET_5* | *OP_SET_6*

*OP_SET_1* = *EQ* | *LE* | *GE* | *NE* | *LT* | *GT*

*OP_SET_2* = *OP_SET_1 TODAY -* | *OP_SET_1 TODAY +*

*OP_SET_3* = *OP_SET_1 NOW -* | *OP_SET_1 NOW +*

*OP_SET_4* = *STARTS_WITH* | *CONTAINS* | *DOES_NOT_CONTAIN* | *IS_EMPTY* | *IS_NOT_EMPTY*

*OP_SET_5* = + | - | * | / | %

*OP_SET_6* = *IS*

| | | |
|---|---|---|
| *For Dates - ARG1 OP ARG2:* | | |
| *[Date Fieldname]* | *OP_SET_1* | *'YYYYMMDD'* \| *[Date Fieldname2]* \| *TODAY* |
| *[Date Fieldname]* | *OP_SET_2* | *integer* |

| | | |
|---|---|---|
| *For Times - ARG1 OP ARG2* | | |
| *[Time Fieldname]* | *OP_SET_1* | *'HHMM'* \| *[Time Fieldname2]* \| *NOW* |
| *[Time Fieldname]* | *OP_SET_3* | *integer* |

| | | |
|---|---|---|
| *For TextStrings - ARG1 OP ARG2* | | |
| *[String Fieldname]* | *OP_SET_1* | *'textstring'* \| *[String Fieldname2]* |
| *[String Fieldname]* | *OP_SET_4* | *'textstring'* |

| | | |
|---|---|---|
| *For Booleans - ARG1 OP ARG2* | | |
| *[Boolean Fieldname]* | *OP_SET_6* | *TRUE* |
| *[Boolean Fieldname]* | *OP_SET_6* | *FALSE* |

| | | |
|---|---|---|
| *For Numbers - ARG1 OP ARG2* | | |
| *[Number Fieldname]* | *OP_SET_1* | *integer* \| *float* |
| *[Number Fieldname]* | *OP_SET_5* | *integer* \| *float* |

FIG. 10

200. FOR each Record in history file
201.     Load record
202.     Write record to Workspace
203. Next

FIG. 11

300. IF Use_Filter = TRUE and R_Application_Is_Filtering = FALSE THEN
301.     FOR each Record in the remote database
302.         Load record
303.         Filter the loaded record
304.         IF record passes the filter THEN mark as PASSED_FILTER
305.         ELSE mark as FAILED_FILTER
306.         Send record to synchronizer
307.         In Synchronizer: Write record to Workspace
308.     Next
309. ELSE IF Use_Filter = TRUE and R_Application_Is_Filtering = TRUE THEN
310.     Send the filter expression to R_Application
311.     Load filtered records
312.     IF the record passes current filter THEN Mark as PASSED_FILTER ELSE Mark as FAILED_FILTER
313.     Send records to synchronizer
314.     In Synchronizer: Write records to Workspace
315. END IF

FIG. 12

350. Form all records in the workspace into CIGs
351. For each CIG
352.     Compare the records in CIG
353.     Determine synchronization outcome
354.     IF a synchronization outcome is a conflict THEN
355.         IF one of the database records in the CIG does not pass the current filter, THEN skip CIG and mark results as DO NOT UPDATE any of the records
356.             ELSE resolve conflict by reference to a user-selected rule or input from the user
357.     END IF
358.     IF the most up to date record fails the filter, THEN mark all records as having failed the current filter
359.     IF the filter expressions contains an unmapped field and one of the database records in the CIG are marked as having failed the filter, THEN mark all records as having failed the filter
360.     IF a fanned out recurring record is partially outside of the current filter, THEN mark the record to be fanned when being unloaded and delete previous fanned nonrecurring records
361. Next

FIG. 13

```
400.  FOR each remote database record
401.      IF Use_Filter = TRUE and the filter is a static filter THEN
402.          IF record is marked as FAILED_FILTER THEN
403.              Delete record on the remote database
404.          Else IF the record is marked as PASSED_FILTER THEN add, delete, or modify
              record according to results of synchronization obtained during CAAR analysis
405.      ELSE IF Use_Filter = TRUE and the filter is a dynamic filter THEN
406.          IF record fails the current filter THEN
407.              Delete record on the remote database
408.          Else IF the record passes the current filter THEN add, delete, or modify record
              according to results of synchronization obtained during CAAR analysis
409.      END IF
410.  Next
```

FIG. 14

```
450.  FOR each local database record
451.      IF Use_Filter = TRUE and the filter is a static filter THEN
452.          IF record is marked as FAILED_FILTER THEN
453.              IF CAAR outcome is to modify the record then modify the record on the
                      local database
454.          Else IF the record is marked as PASSED_FILTER THEN add, delete, or modify
                  record according to results of synchronization obtained during CAAR analysis
455.      ELSE IF Use_Filter = TRUE and the filter is a dynamic filter THEN
456.          IF record fails the current filter but marked as PASSED_FILTER THEN
457.              IF CAAR outcome is to modify the record then modify the record on the
                      local database
458.          Else IF the record passes the current filter THEN add, delete, or modify record
                  according to results of synchronization obtained during CAAR analysis
459.      END IF
460.  Next
```

FIG. 15

SYNCHRONIZATION OF DATABASES USING FILTERS

CROSS REFERENCE TO RELATED APPLICATIONS

This application is a continuation in part of "Synchronization of Databases with Date Range," Serial No. 08/748,645, filed Nov. 13, 1996.

REFERENCE TO MICROFICHE APPENDIX

An appendix (appearing now in paper format to be replaced later in microfiche format) forms part of this application. The appendix, which includes a source code listing relating to an embodiment of the invention, includes 1024 frames on 11 microfiche.

This patent document (including the microfiche appendix) contains material that is subject to copyright protection. The copyright owner has no objection to the facsimile reproduction by anyone of the patent document as it appears in the Patent and Trademark Office file or records, but otherwise reserves all copyright rights whatsoever.

BACKGROUND

This invention relates to synchronizing databases.

Databases are collections of data entries which are organized, stored, and manipulated in a manner specified by applications known as database managers (hereinafter also referred to as "Applications"; hereinafter, the term "database" also refers to a database manager combined with a database proper). The manner in which database entries are organized in a database is known as the data structure of the database. There are generally two types of database managers. First are general purpose database managers in which the user determines (usually at the outset, but subject to future revisions) what the data structure is. These Applications often have their own programming language and provide great flexibility to the user. Second are special purpose database managers that are specifically designed to create and manage a database having a preset data structure. Examples of these special purpose database managers are various scheduling, diary, and contact manager applications for desktop and handheld computers. Database managers organize the information in a database into records, with each record made up of fields. Fields and records of a database may have many different characteristics depending on the database manager's purpose and utility.

Databases can be said to be incompatible with one another when the data structure of one is not the same as the data structure of another, even though some of the content of the records is substantially the same. For example, one database may store names and addresses in the following fields: FIRST_NAME, LAST_NAME, and ADDRESS. Another database may, however, store the same information with the following structure: NAME, STREET_NO., STREET_NAME, CITY_STATE, and ZIP. Although the content of the records is intended to contain the same kind of information, the organization of that information is completely different.

Often users of incompatible databases want to be able to synchronize them with one another. For example, in the context of scheduling and contact manager Applications, a person might use one application on a desktop computer at work while another on his handheld computer or his laptop computer while away from work. It is desirable for many of these users to be able to synchronize the entries on one with entries on another. U.S. patents of the assignee hereof, Puma Technology, Inc. of San Jose, Calif. (U.S. Pat. No. 5,392,390, hereinafter, "the '390 patent", incorporated by reference herein; and U.S. Pat. No. 5,684,990, filed on Jan. 11, 1995, incorporated by reference herein) show two methods for synchronizing incompatible databases and solving some of the problems arising from incompatibility of databases.

SUMMARY

In one general aspect, the invention features a computer program for synchronizing at least a first and a second database. A plurality of records of the first database fitting a selected criterion are identified. At least one of the identified records of the first database is then synchronized with a record of the second database.

In another general aspect, the invention features a computer program for synchronizing at least a first and a second database. On a computer display, a record selection criteria input region is displayed for a user to input a record selection criteria. Then, the first database is synchronized with the second database using the record selection criteria.

Preferred embodiments may include one or more of the following features.

Records representative of the records of the first and second databases during a prior synchronization are stored in a history file. In that case, when synchronizing the identified records of the first database with the records of the second database, the history file is used.

Records of the second database may also be identified based on a selected criterion. In that case, the identified records of the first database are synchronized with the identified records the second database.

Records of the first and second databases may include text, number, boolean, binary, date, and time fields. The criteria for identifying the records in turn may include text, number, boolean, binary, date and time criteria with which the fields of the records and databases are compared.

The first database can be located on a first computer and the second database located on a second computer. At the first computer, it is then determined whether a record of the first database has been changed or added since a previous synchronization, using a first history file located on the first computer including records representative of records of the first database at the completion of the previous synchronization. If the record of the first database has not been changed or added since the previous synchronization, information which the second computer uses to identify the record of the first database to be unchanged is sent from the first computer to the second computer. Additionally, the identification of the records of the first database based on the selected criterion may be performed at either the first or second computer.

Based on data reflecting whether the records of the first database have been added or changed since a previous synchronization, it may be determined whether the records of the first database have been changed or added since a previous synchronization. If one of the records of the first database has not been changed or added since the previous synchronization, a synchronization with records of the second database using a record representative of the one record at the time of a previous synchronization is performed. The representative record is stored in a history file containing records reflecting the contents of records of the databases at the time of a previous synchronization.

A second plurality of the records of the first database failing to fit the selected criterion may be deleted.

The selected criterion may have a current value during a current synchronization being different from a previous value during a previous synchronization. In that case, a plurality of records of the second database may be updated, based on results of the synchronization, where the plurality of records of the second database fit the previous value of the selected criterion but fail to fit the current value of the selected criterion.

A third database may be synchronized with the second database by identifying a plurality of records of a third database fitting a second selected criterion and synchronizing at least one of the identified records of the third database with a record of the second database. The record of the second database can include a code identifying the record as having originated from the third database.

A record selection criteria may be transmitted to a database manager which manages the first database and the database manager may select records of the first database fitting the record selection criteria. The database manager may then transmit the selected records to the synchronization program. The records of the first database fitting the record selection criteria may also be selected at a synchronization program.

The selected criterion may be, for example, a filter or filter expression which a record must match or fit in order for that record to pass the filter expression.

Embodiments of the invention may include one or more of the following advantages.

Users of various embodiments of the invention can use those embodiments to achieve a variety of ends. For example, handheld computers typically have limited storage capacity. Using the filtering capability of some embodiments, a user can limit the records stored on the handheld computer to only those records which fit a selected filter.

A user can also use a filter in some embodiments to increase the speed of synchronization. For example, it may be the case that the data transfer link between the two computers has a low data transfer rate. Therefore, the user by using a filter reduces the number of records to be transferred from one computer to the other.

A user can also use the filtering mechanism to synchronize some of the records of his or her database with the related records of another user's database, without affecting the unrelated records. For example, consider the situation where two database users work on a shared project or take a joint business trip on behalf of their enterprise. These two database users may desire to synchronize their databases but only with respect to those records relating to that project or trip. By using a filter, they may limit the synchronization between the two databases to records which relate to the project or the trip, without affecting other records in their respective databases.

The invention may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages of the invention will become apparent from the following description of preferred embodiments, including the drawings, and from the claims.

BRIEF DESCRIPTION OF THE DRAWING

FIG. 4 is pseudocode for a Translation Engine Control Module of the synchronization program of FIG. 2.

FIG. 5 is pseudo code for the steps taken by Parameter Table Generator module of the synchronization program of FIG. 2.

FIG. 10 shows a table detailing semantics of a filter language used in the synchronization program of FIG. 2.

FIG. 11 is pseudocode for loading a history file.

FIG. 12 is pseudocode for the steps taken by a translator to load records of a remote database.

FIG. 13 is pseudocode for the steps taken by the synchronizer module of the synchronization program of FIG. 2 for performing Conflict Analysis and Resolution when synchronizing using a filter expression.

FIG. 14 is pseudocode for the steps taken by a translator to unload records to a remote database.

FIG. 15 is pseudocode for the steps taken by a translator to unload records to a local database.

DESCRIPTION

Figure 1:
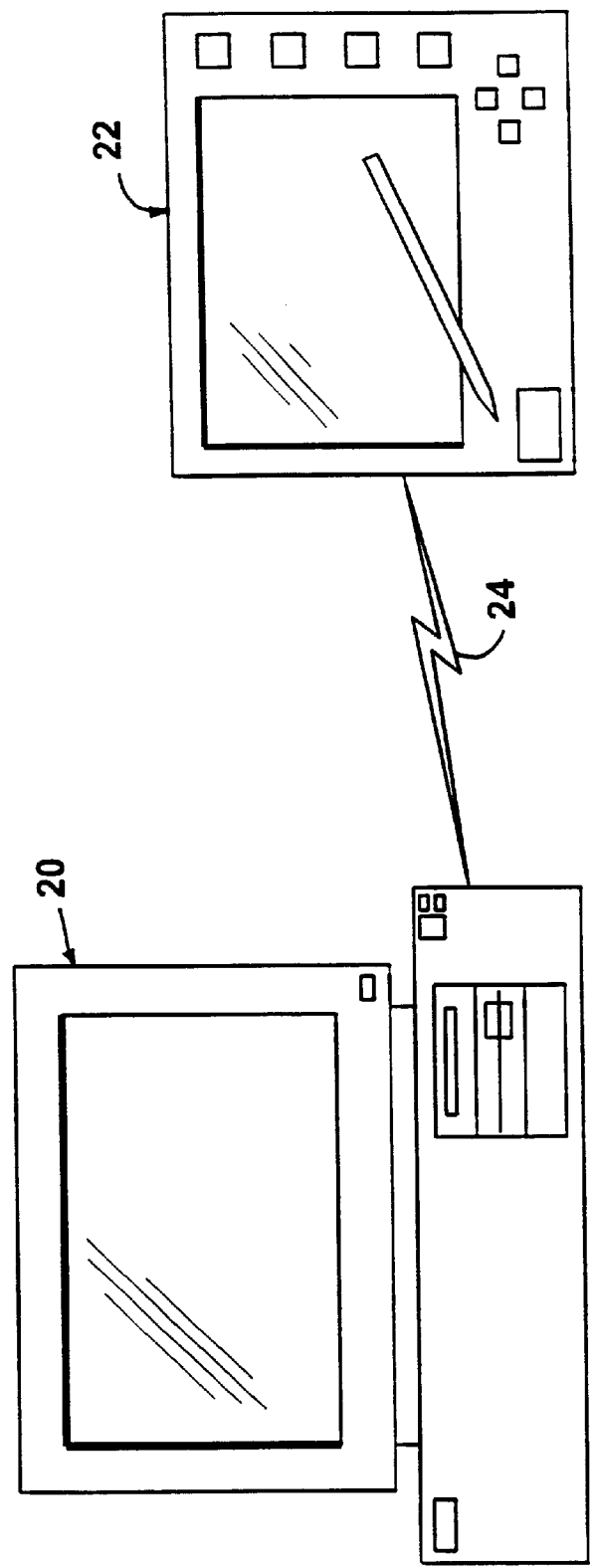
FIG. 1 shows two computers connected via a data transfer link.
Figure 2:
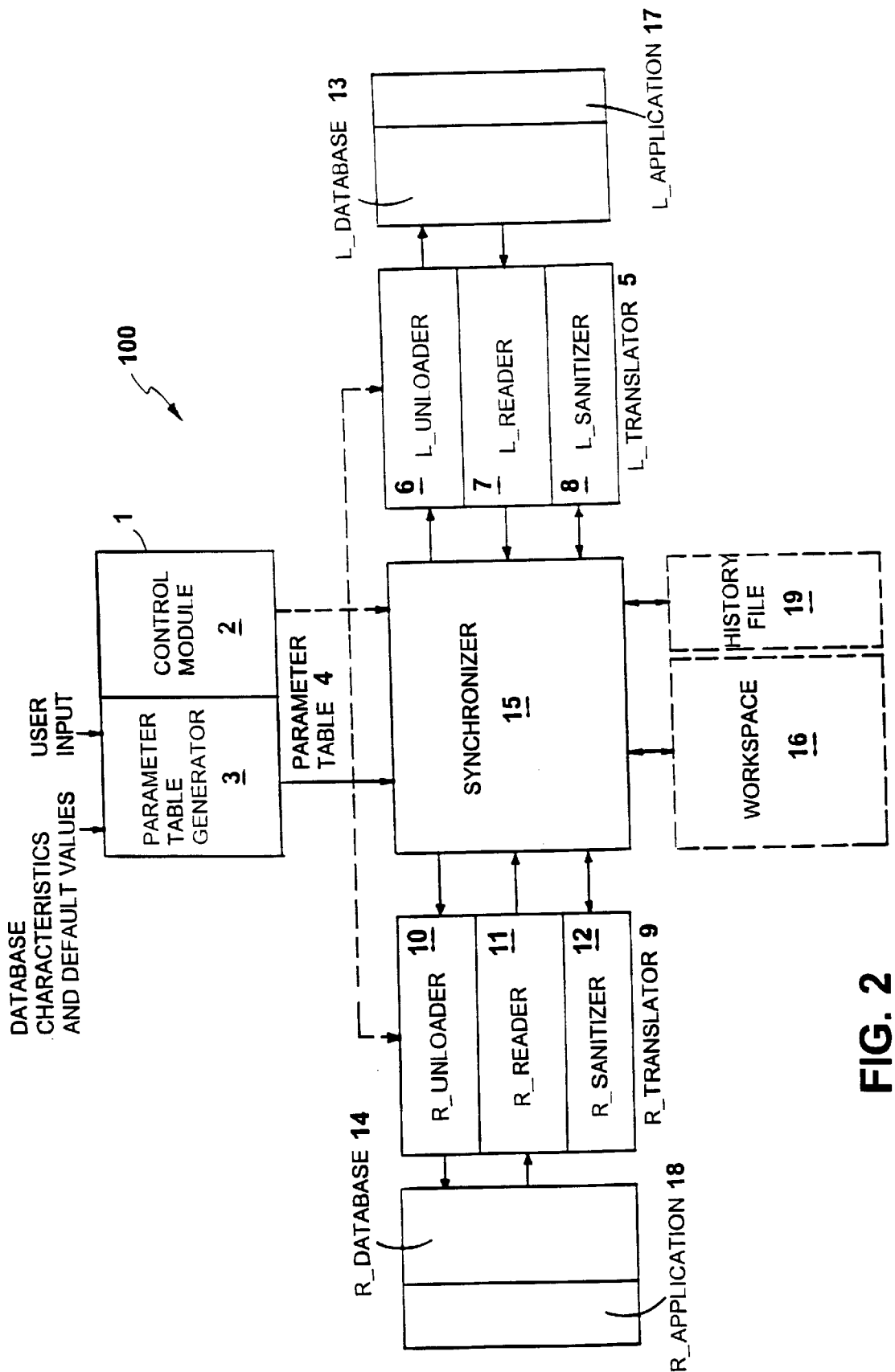
FIG. 2 is a schematic drawing of the various modules constituting an embodiment of a synchronization program.

We will describe embodiments of the invention in detail below, but briefly, referring to FIGS. 1 and 2, a synchronization program 100 runs on a local computer 20 (e.g. a desktop or server computer) which is typically connected to a remote computer 22 (e.g. a handheld or notebook computer) via a data transfer link 24 enabling the computers to transfer data between them. Data transfer link 24 may be a serial infrared link, serial cable, modem and telephone line combination, or other such data transfer links. Each of the local and remote computers stores a corresponding local or remote database, which may, for example, be a scheduling database (such as those sold under the tradenames Microsoft Schedule+and Lotus Organizer).

Synchronization program 100 synchronizes the records of the local and remote databases typically using a history file that contains records reflecting the records of the two databases at the end of a previous synchronization. The synchronization program uses the history file to determine, for example, which records have been changed, added or deleted since the previous synchronization and which records of the two databases correspond to one another.

Synchronization program 100 allows the user to input a filter expression. Generally, a filter or filter expression may considered to be a set of conditions or criteria which a record must match or fit in order for that record to pass the filter expression. A record that does not fit those criteria therefore fails the filter.

Synchronization program 100 uses the filter expression to identify and mark which records of the local and remote databases pass or fail the filter expression. The two databases are then synchronized. After synchronization, synchronization program 100 uses the results of synchronizing the two databases to add, modify, or delete the records of the two databases. At this point, the user can, for example, select to have those records falling outside the filtering criteria to be deleted, not to be affected at all by the synchronization program, or be treated in other manner, as will be described below. In other embodiments, synchronization program 100 uses the filter expression to identify and mark the records of only one of the databases.

We will now describe in detail the structure of synchronization program 100 and the method it uses to synchronize the local and remote databases using filter expressions. FIG. 2 shows the relationship between the various modules of an embodiment of synchronization program 100. Translation Engine 1 comprises Control Module 2 and Parameter Table Generator 3. Control Module 2 is responsible for controlling the synchronizing process by instructing various modules to perform specific tasks on the records of the two databases being synchronized. (FIG. 4 shows the steps taken by this module.)

Parameter Table Generator 3 is responsible for creating a Parameter_Table 4 which is used by all other modules for synchronizing the databases. Generally, Parameter_Table 4 stores various information which may be used by the modules of the synchronization program. The information stored in Parameter_Table 4 includes user preferences, the names and locations of the databases, and the names and locations of various files stored on disk including the name and location of the history file from the previous synchronization. Parameter Table Generator 3 also provides the user with various graphical user interface windows for inputting filter expressions to be used during synchronization. Parameter Table Generator 3 converts such user input filter expressions or previously stored filter expressions into data structures which may then be used by various modules of synchronization program 100 during synchronization. The steps taken by Parameter Table Generator 3 in relation to filter expressions will be described in detail below.

Figure 3:
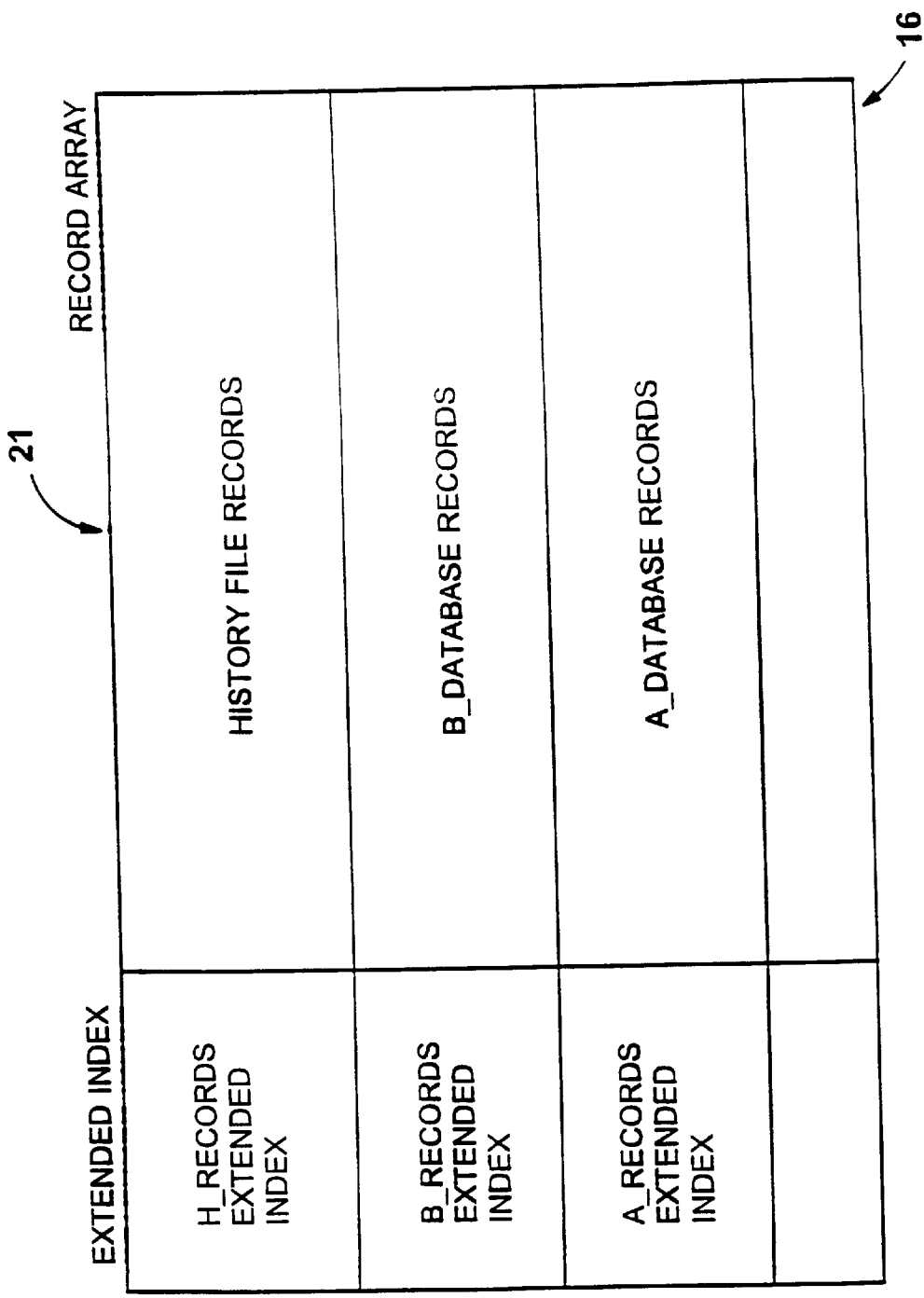
FIG. 3 is a representation of a workspace data array used by the synchronization program of FIG. 2.

Synchronizer 15 has the primary responsibility for carrying out the core synchronizing functions. It is a table-driven code which is capable of synchronizing various types of databases whose characteristics are provided in Parameter_Table 4. Synchronizer 15 creates and uses workspace 16 (also shown in FIG. 3), which is a temporary data array used during the synchronization process.

Synchronization program 100 has two translator modules 5 and 9 which are generally responsible for data communication between synchronization program 100 and databases 13 and 14. Translator (L_translator) 5 is assigned to the local database (L_database) 13 and translator 9 (R_translator) to the remote database (R_database) 14. Each of the database translators 5 and 9 comprises three modules: reader modules 6 and 10 (L_reader and R_reader) which load (or read) records from databases 13 and 14; unloader modules 8 and 12 (L_unloader and R_unloader) which analyze and unload records from workspace 16 into databases 13 and 14; and sanitizing modules 7 and 11 (L_sanitizer and R_sanitizer) which analyze the records of the opposing database when they are loaded into the workspace and modify them according to rules of data value of the modules's own database. Briefly stated, rules of data value are generally rules that define the permitted content of the fields of the records of a database. An example of such a rule would be that no more than 100 characters may be present in a field, or that content of a field designating a priority for a "to do" item should be limited to 1, 2, or 3. Sanitizing a record is to change the content of the fields of a record of one database to conform to the rules of data value of another database. Rules of data value and sanitization are described in detail in the following commonly owned U.S. patent applications, incorporated in their entirety by reference, "Synchronization of Recurring Records in Incompatible Databases", Ser. No. 08/752,490, filed on Nov. 13, 1996 (hereinafter, "application '490"); "Synchronization of Databases with Record Sanitizing and Intelligent Comparison," Ser. No. 08/749,926, filed Nov. 13, 1996 (hereinafter, "application '926"); "Synchronization of Databases with Date Range," Ser. No. 08/748,645, filed Nov. 13, 1996 (hereinafter, "application '645").

In the described embodiment, the modules of L_translator 5 are designed specifically for interacting with local database 13 and local application 17. The design of the modules of L_translator 5 is specifically based on the record and field structures and the rules of data value imposed on them by the local application, the Application Program Interface (API) requirements and limitations of local application 17 and other characteristics of the local database and application. The same is true of the modules of R translator 9. These translators are typically not able to interact with other databases or Applications and are only aware of the characteristics of the database and application for which they are designed. Therefore, when the user chooses two applications for synchronization, Translation Engine 1 chooses the two translators which are able to interact with those applications. In an alternate embodiment, the translators can be designed as table-driven codes, where a general translator is able to interact with a variety of applications and databases based on supplied parameters.

Having described the structure of synchronization program 100 in reference to its various modules, we will now describe the operation of synchronization program 100. During synchronizing the two database, Control Module 2 instructs the various modules in synchronization program 100 to perform specific tasks. We will describe the operation of synchronization program 100 by describing the steps taken by Control Module 2 (as set out in the pseudo code in FIG. 4) and describing in detail the actions by the various modules as they are instructed by Control Module 2.

Referring to FIG. 4, in the first step of synchronizing the two databases, Control Module 2 instructs the Parameter Table Generator 3 to create parameter table 4 (Step 100). In this step, as part of creating parameter table 4, Parameter Table Generator 3 obtains from the user a filter expression, if any, to be used during synchronization or alternatively accesses a previously stored filter expression, if any.

Figure 6:
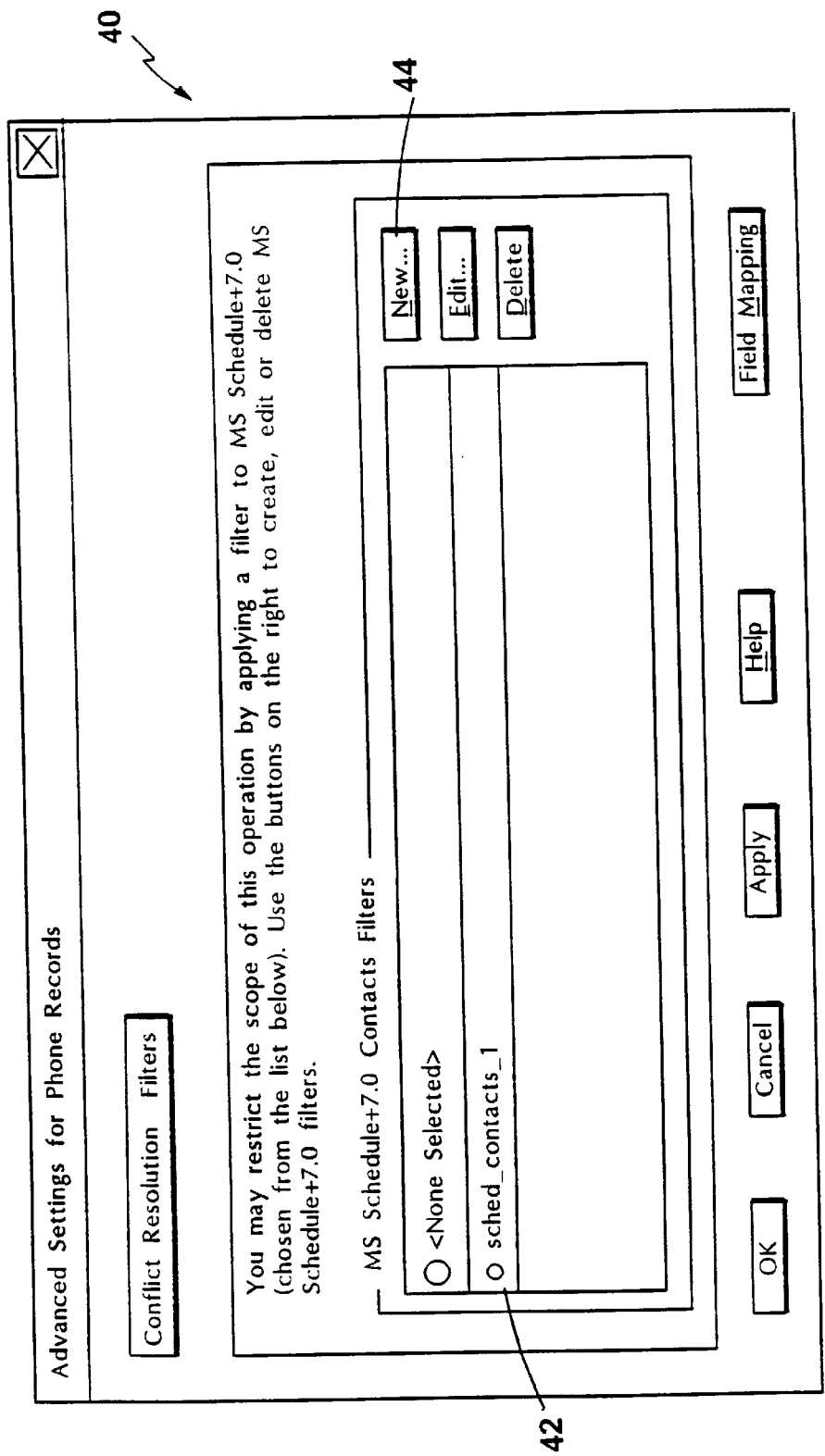
FIG. 6 shows a filter selection graphical user interface (GUI) window.

FIG. 5 is pseudo code for the steps taken by Parameter Table Generator 3 in relation to filter expressions. In step 150, Parameter Table Generator 3 determines from the user whether a filter should be used during the current synchronization. FIG. 6 shows a filter selection window 40 which the user uses to select whether to use a filter for the current synchronization. If the user selects to use a filter (step 151), Parameter Table Generator 3 next determines the filter to be used (step 152). This filter may be a previously stored filter expression (e.g. filter 42 in FIG. 6) or a filter expression which the user inputs (e.g. by selecting "New" button 44 in FIG. 6).

Figure 7:
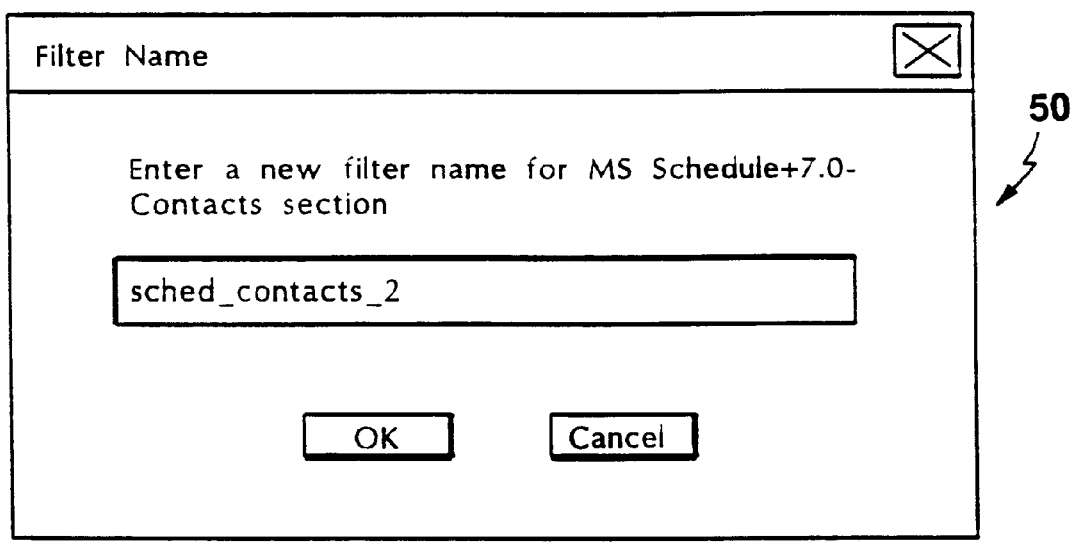
FIG. 7 shows a filter name input graphical user interface (GUI) window.

For a new filter, the user uses a filter name input window 50 to input the filter's name (step 153), shown in FIG. 7. The user then uses a filter criteria input window 60 (step 154), shown in FIGS. 8 and 9, to input the filter expression for the new filter. We will describe window 60 in further detail below. Parameter Table Generator 3 next stores the current date and time in the FILTER_CHANGED_TIMESTAMP parameter (step 155). This parameter is used to determine whether a filter has changed since a previous synchronization. Parameter Table Generator 3 then assigns a unique filter identifier code to the filter expression, which is then used to identify the filter (step 156).

If the user selects to use a previously stored filter expression, Parameter Table Generator 3 obtains the name of the filter from the user (step 157) and then retrieves the filter expression and the unique filter identifier code of that filter (step 158). If the user selects to edit the filter, Parameter Table Generator 3 displays the filter expression in window 60 and allows the user to edit the filter expression (step 159). In this step, Parameter Table Generator 3 also stores the current date and time in the FILTER_CHANGED_TIMESTAMP parameter, as in step 155.

In step 160, Parameter Table Generator 3 sets the FILTER_ID parameter to the unique filter identifier of the filter that was selected. The modules of synchronization program 100 use FILTER_ID parameter to determine the correct filter to use. Parameter Table Generator 3 next sets USE_FILTER flag (step 161). This flag indicates to various module of synchronization program 100 that a filter is to be used during synchronization and causes the appropriate modules to take the necessary steps, as will be described in further detail below.

During synchronization, the filter may be applied to the records of the database by either the translator for that database or by the database manager application of that database, if the database manager application is capable of applying a filter. In step 162, Parameter Table Generator 3 parses the filter expression into a filter token array which the translators use when filtering records of the databases and history file. The filter token array and the manner in which it is used will be described in detail below. Parameter table generator 3 will next create Parameter_Table 4, as described in detail in the '490, '926 and '645 applications.

Having described the steps taken by Parameter Table Generator 3 with respect to a filter to be applied during synchronization, we will now describe in detail graphical user interface (GUI) windows displayed for entering the filter expressions, the semantics of filter language used in the described embodiment, the manner in which inputted filter criteria are stored, and the method used by translators to determine whether a record passes the filter. However, it should be noted that other filtering languages and methods may also be used to filter records during synchronization.

Generally, synchronization program 100 uses two types of filters: static and dynamic filters. Static filters have a fixed and unchanging filter expression. For example, the filter "appointments in 1997" is a static filter. It will always the cover the appointments in 1997. Dynamic filters have a changing filter threshold value, which may depend on a changing parameter. For example, the filter "appointments from today until a year from today" is a dynamic filter because the threshold value of the filter changes as the value of "today" changes. (It should be noted that the above examples are also examples of date range filters. Date range filters filter records based on whether the dates of the records fall within a range of dates specified by the filter.)

In the case of dynamic filters, Parameter Table Generator 3 uses the dynamic filter to create two filter expressions to be used during synchronization. The first filter expression, which we will refer to as the current filter, is based on the value of the filter for the current synchronization. For example, in the case of date range filters based on the value of the current synchronization's date, the value of the current filter will be based on the current synchronization's date. (Date range filters and a method of synchronizing databases using them are described in detail in the '490, '926 and '645 applications.) Since a dynamic filter is a changing filter, records which were previously within the filter may not be within the current filter. However, those records and any changes in those records should be used during the current synchronization since the user likely treated those records as being validly within the filter and might have modified them. Therefore, Parameter Table Generator 3 creates a second filter expression, which we will refer to as the loading filter, which combines the value the current filter with the value of the filter as it was during a previous synchronization. For example, in the case of a dynamic date range, the loading filter would be a concatenation of the current filter and the filter based on the date of the previous synchronization. The manner in which these two filters are used will be described below.

In synchronization program 100, a filter expression applied to both local and remote databases. However, the filter expression is typically inputted and stored based on the list of fields of one of the databases—in the described embodiments, the local database. A field map which maps the fields of the two databases onto one another is used by synchronization program 100 to apply a filter expression based on the field list of one of the databases to the fields in the records of the other database, as will be described in detail below.

The table in FIG. 10 shows the specification of the semantics of the filter language. We define a filter expression (or filter criteria) as a group of one or more filter conditions (or filter criterion). In the filter language described here, when a record is evaluated against a filter condition, the result may be either a boolean value (i.e. TRUE or FALSE) or a numeric value (e.g. 1, 2, 3). However, the final result of evaluating a record against the filter expression is a boolean value which indicates whether the record has passed or failed the filter.

A filter condition may be considered to be a sentence having three parts: <evaluated operand> <filter operator> <filter threshold operand>, where the evaluated operand is the operand to be evaluated against the filter, filter threshold operand is the threshold value of the filter condition, and the operator is the filtering function to be performed between the evaluated operand and filter threshold operand. For example, the following is a filter condition: <date field> <is greater than or equal to> <TODAY>.

An operand may have one of two values: a value inputted by a user or a value taken from a record to be evaluated. To indicate that the value of an operand is to be taken from a field in a record, the name of that field is used as the operand. In the described filter language, a field name is enclosed with brackets—e.g. [Start Date]. During evaluation of a record against the filter, the value stored in that field of the evaluated record will be used as the operand.

In the case where the operand has a user inputted value, the operand contains that value—e.g. 'Smith', 456–7896, or 'TODAY'. In the described filter language, the user-inputted operands may have one of the following types of values, which is coextensive with the possible field values of the local and remote databases: DATE, TIME, TEXTSTRING, BOOLEAN or NUMBER.

We will now describe in detail an example of the range of values the various types of user-inputted operands in the described filter language may have. However, it should be noted that other embodiments may have other ranges and limitations. In the described embodiment, DATE operands are formatted as 'YYYYMMDD' (in some embodiments, single quotes must be included)—example '19980101' is New Years Day of 1998. DATE operands may also have the value TODAY, which indicates the date for today obtained from the operating system of the computer. TIME operands are formatted as 'HHMM' on a 24-hour clock basis (in some embodiments, single quotes must be included)—for example, '0600' represents 6:00 AM and '1300' represents 1:00 PM. TIME operands may also have the value NOW, which indicates the current time obtained from the operating system of the local computer.

TEXTSTRING operands can contain any text value (in some embodiments, single quotes must be included to indicate that the value is a text string)—examples are 'Puma Technology, Inc.', '15', and '#$%'. BOOLEAN operands must be of value TRUE or FALSE (no use of single quotes). NUMBER operands may be any integer or floating point number (in some embodiments, single quotes are not used for NUMBER operands).

In the described filter language, the available filter operators are organized into seven different operator sets. The first operator set (also referred to as "OP_SET_1") includes the following filter operators: EQ (equal), LE (less than or equal), GE (greater than or equal), NE (not equal), LT (less than) and GT (greater than). This set of operators may be used for all of the various types of operands, provided that both operands involved in the filter condition are of the same type.

The second operator set (also referred to as "OP_SET_2") is to be used only when evaluated operand is of the type DATE. OP_SET_2 provides for using dynamic filters for operands of type DATE (e.g. dynamic date range filters). OP_SET_2 is made up of all combinations of the filter operators in OP_SET_1 and the variables TODAY– and TODAY+. An OP_SET_2 filter operator is followed by a filter threshold operand whose value is a selected number of days. The variable TODAY+ in an OP_SET_2 filter operator then indicates the number of days in the filter threshold operand is to be added to the date of the current synchronization prior using the OP_SET_1 filter operator to evaluate filter. For example, consider the filter condition: <appointment date> <LT TODAY+> <3>. In this filter expression, 3 days are added to the date of the current synchronization to obtain the date of the third day after today and then the filter operator LT is used to determine whether the appointment date is less than the date of the third day after today.

The third operator set (also referred to as "OP_SET_3") is similar the second operator set and is used only when both operands are of the type TIME. OP_SET_3 provides for using dynamic filters for operands of type TIME. OP_SET_3 includes all combinations of filter operators in OP_SET_1 with the variables NOW– and NOW+. The variable NOW represents the time of the current synchronization, typically obtained from the operating system. An OP_SET_3 filter operator is followed by a filter threshold operand whose value is a selected number of seconds. The variables NOW+ and NOW– are used in the same manner as the variables TODAY+ and TODAY–.

The fourth operator set (also referred to as "OP_SET_4") may be used when both operands are of the type TEXTSTRING. OP_SET_4 includes the following operators: STARTS_WITH, CONTAINS, DOES_NOT_CONTAIN, IS_EMPTY and IS_NOT_EMPTY.

The fifth operator set (also referred to as "OP SET_5") may be used when both operands are of the type NUMBER. OP_SET_5 includes the following operators: + (addition), – (subtraction) * (multiplication), / (division) and % (modulus).

The sixth operator set (also referred to as "OP_SET_6") may be used only when both operands are of the type BOOLEAN. OP_SET_6 includes only the operator IS.

The seventh operator set (termed OP_SET_7) may be used to combine two filter conditions. OP_AND_OR includes the relational operators AND and OR. Filter conditions may be combined using the seventh operator set to form filter expressions. In the described embodiment, the operand from the seventh operator set are used so as to achieve one of two results: a record must either meet all of the filter conditions in a filter expression or only one of the filter conditions. In other embodiments, more complex filter expressions may be permitted. In such embodiments, the order of evaluation may follow a predetermined order of evaluation (e.g. the order of evaluation in the 'C' programming language) which may in turn be modified by parentheses.

Following are several exemplary filter expressions based on the above described filter language:

[Full Name] CONTAINS 'Smith' AND [Private Flag] IS FALSE ([Priority] / 2) GT 0

[Alarm Date] EQ '19980101' AND ([Regarding CONTAINS 'meeting' OR [Regarding] CONTAINS 'training') AND [Location] CONTAINS 'Boston'

Referring back to FIGS. 8 and 9, the user uses the filter expression input window 60 to enter the filter expression to be used during synchronization. Filter expression input window 60 includes two so-called tabs (e.g. used in operating systems sold under the tradename Windows by Microsoft Corporation of Redmond, Wash.). Conditions tab 62 (shown in FIG. 8) is used to input the filter conditions. Rules tab 64 (shown in FIG. 9) is used to select how the filter conditions should be combined to create the filter expression.

Figure 8:
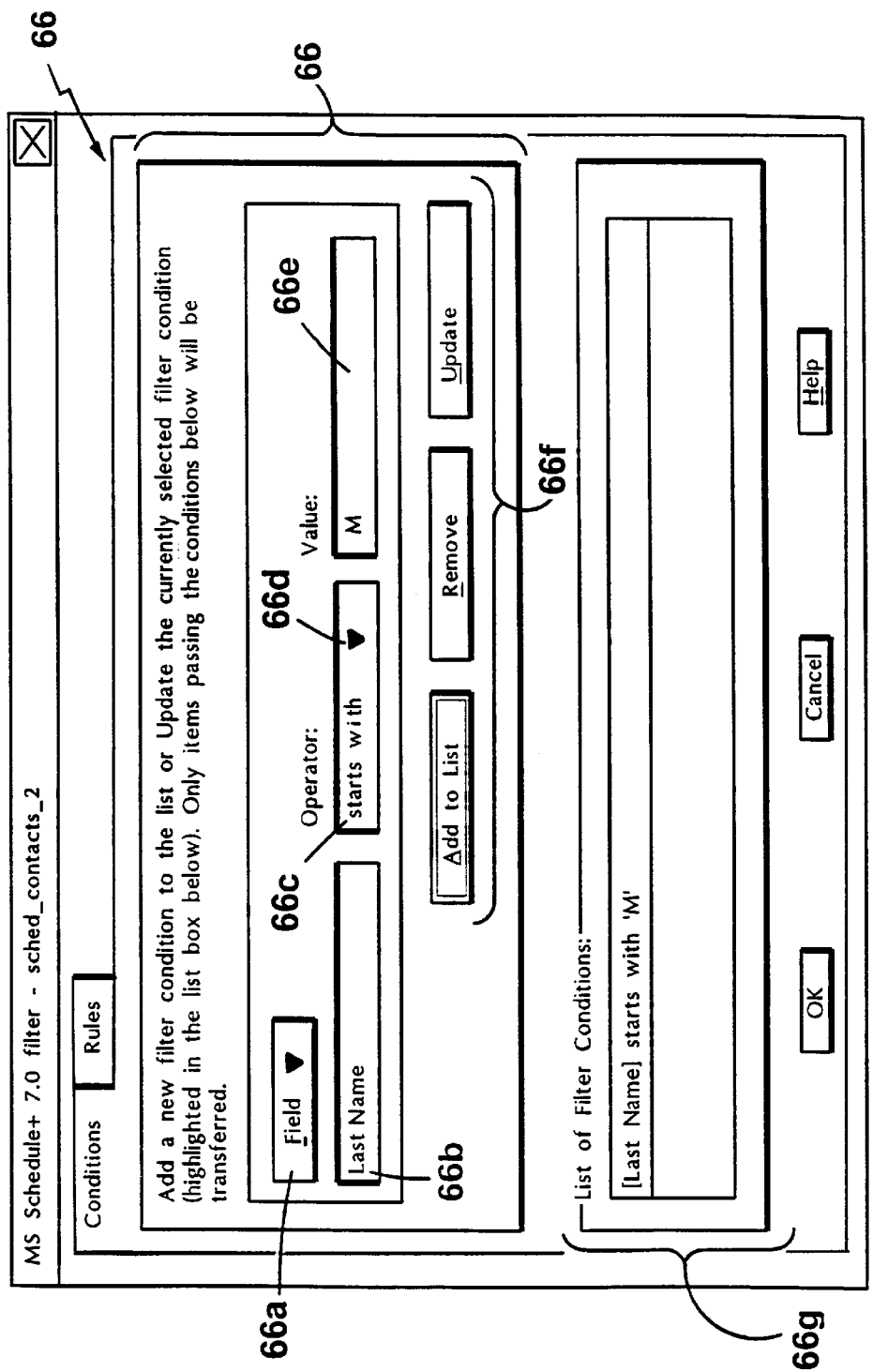
FIGS. 8 and 9 show a filter criteria input graphical user interface (GUI) window.

Referring to FIG. 8, conditions tab 62 includes a filter condition input region 66. The user can select a field name from a list of field names of the database on which the filter is based by using pull-down menu 66a. Alternatively, the user may type a valid name in field name region 66b. The user may also type in a valid filter threshold operand in threshold operand region 66e. In filter operator region 66c, the user may type a valid filter operator or select one from a filter operator pull-down menu (not shown; only button 66d for clicking on to pull-down the menu is shown). It should be noted that the list of available options in pull-down menu 66d is limited by the type of operand entered in field name region 66b or filter threshold operand region 66e.

The user may add a filter condition to the list displayed in filter conditions display region 66g or remove a filter condition from that list, by selecting the appropriate button in region 66f. The user may also update (i.e. change or edit) a filter condition, by selecting the appropriate "button" in region 66f.

Figure 9:
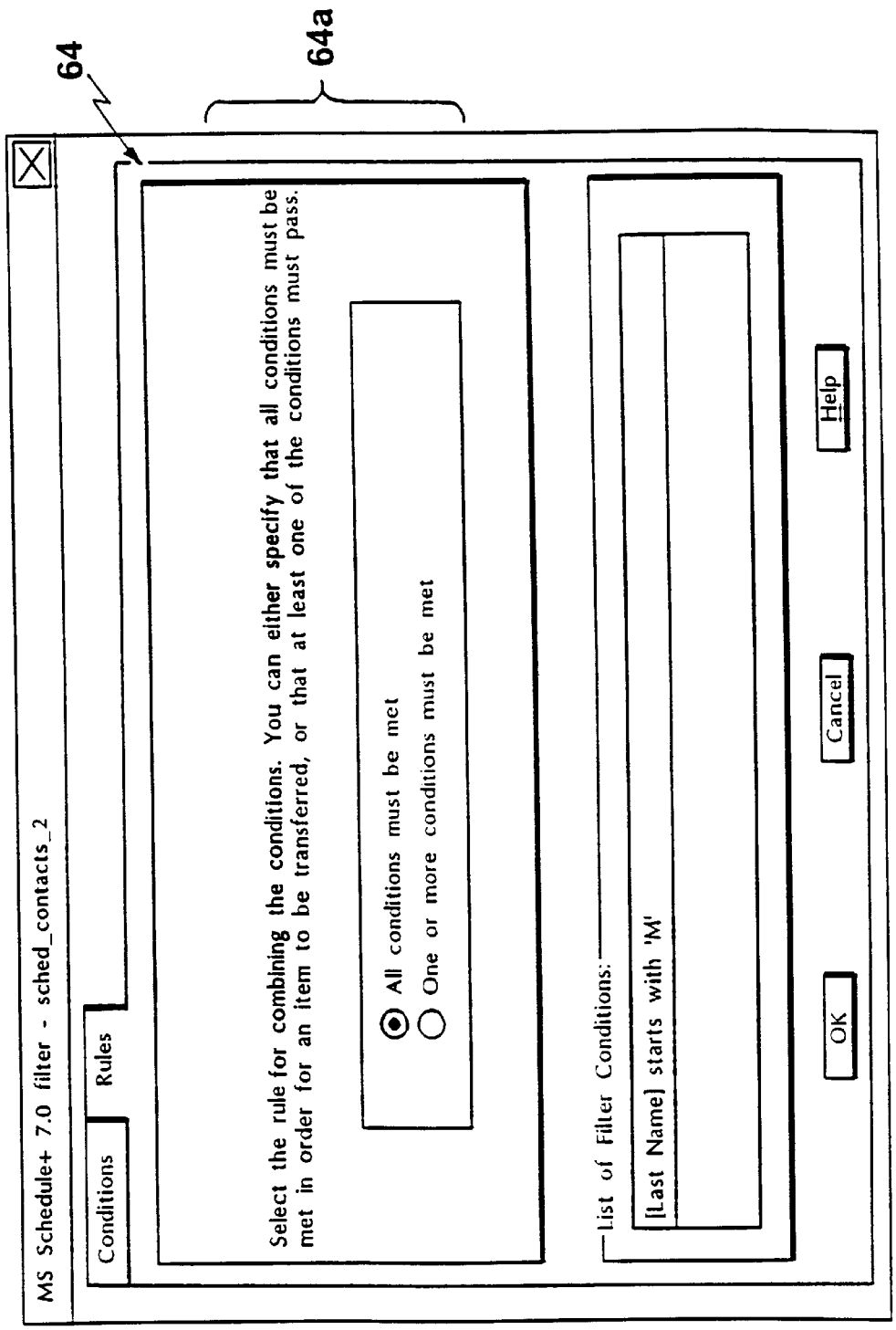

Referring to FIG. 9, in rules tab 64, more particularly in region 64a, the user may select whether a record must either meet all of the filter conditions inputted by the user or only one of the filter conditions in order to pass the filter.

The filter expression input by the user in the filter expression input window 60 is then stored as a filter expression based on the above described filter language.

We will now describe the filtering methodology used in synchronization program 100 to evaluate a record against a filter. Briefly, the filtering methodology used in synchronization program 100 generally has two steps. The first step is parsing the stored filter expression and forming a filter token array which is designed to facilitate evaluating the records against the filter. In synchronization program 100, Parameter Table Generator 3 performs this step (FIG. 5, step 162). The second step is evaluating each record of the database or the history file to be filtered against the filter expression to determine whether the record passes the filter. In synchronization program 100, the translators performs this step in the case of the local and remote databases. Synchronizer 15 performs this step for the history file. We will now describe each of these steps in detail.

Parameter Table Generator 3 parses the stored filter expression and then forms the filter expression into a filter token array to be used during evaluation of the records against the filter expression. A token in the filter token array is a data structure which represents either an operand (i.e an evaluated operand or a filter threshold operand) or a filter operator. A token contains two pieces of information—the type of the token and the value of the token. The type of the token may be one of the following: TEXTSTRING, DATE, TIME, BOOLEAN, NUMBER, OP_SET_1, OP_SET_2, OP_SET_3, OP_SET_4, OP_SET_5, OP_SET_6 or OP_SET_7. The value of the token will be the actual content of the token and is stored as a string of characters which is obtained from the filter expression. For example, a token which represents a date filter threshold operand "2/7/1988" will have a DATE type and a "2/7/1988" value. A filter operand GE (greater than or equal to) will have a OP_SET 1 type and a "GE" value. An evaluated operand having a field name "[contact address]" will have a TEXTSTRING type and a "[contact address]" value.

As Parameter Table Generator 3 parses the filter expression, it turns the operands and operators of the filter conditions into tokens. Each filter condition yields three tokens. Parameter Table Generator 3 stores the tokens in the filter token array in a specific order. In the case of each filter condition, the evaluated operand token is stored first, followed by the filter threshold operand token and then the filter operator token. In the case of filter operators from OP_SET_7 (i.e., the filter operators AND and OR), the two filter conditions connected by the operator are stored first, followed by the filter operator. Ordering the tokens in this manner facilitates evaluating the records against the filter, as will be described below.

As an example, parameter generator 3 parses the following filter expression:

[Alarm Date] EQ '19980101' AND ([Regarding] CONTAINS 'meeting' OR [Regarding] CONTAINS 'training') AND [Location] CONTAINS 'Boston' into the following token array:

| value | type |
| --- | --- |
| AND | OP_SET_7 |
| CONTAINS | OP_SET_4 |
| 'Boston' | TEXTSTRING |
| [Location] | TEXTSTRING |
| AND | OP_SET_7 |
| OR | OP_SET_7 |
| CONTAINS | OP_SET_4 |
| 'training' | TEXTSTRING |
| [Regarding] | TEXTSTRING |
| CONTAINS | OP_SET_4 |
| 'meeting' | TEXTSTRING |
| [Regarding] | TEXTSTRING |
| EQ | OP_SET_1 |
| '19980101' | DATE |
| [Alarm Date] | DATE |

As stated above, the second step in filtering the records of a database is evaluating each record of that database against the filter expression. The translator of the database to be filtered performs this step. Both of these modules use the same method of evaluation, which we will now describe.

To evaluate a record against a filter expression, a translator uses a stack, which we will refer to as the evaluation stack. To evaluate the record, starting with the last item in the filter token array, the translator proceeds through the filter token array and pushes copies of the operand tokens onto the evaluation stack. When an operand token is a field name, the translator instead of pushing the field name, pushes the data stored in that field of the record onto the stack. When the translator encounters an operator token in the token array, the translator pops the last two items in the evaluation stack and evaluates the two items based on the filter operator. The translator push the result of the evaluation, which may be either of the type BOOLEAN or NUMBER, onto the evaluation stack. After the translator evaluates the entire filter expression, a single boolean value is left in the stack which indicates whether the record has passed the filter.

We will now provide an example of evaluating a record against a filter. Prior to the evaluating step, Parameter Table Generator 3 would have parsed the following filter expression:

[Last Name] STARTS_WITH 'A' AND [City] EQ 'Boston' into the following token array:

| value | type |
| --- | --- |
| AND | OP_SET_7 |
| EQ | OP_SET_1 |
| 'Boston' | TEXTSTRING |
| [City] | TEXTSTRING |
| STARTS_WITH | OP_SET_4 |
| 'A' | TEXTSTRING |

-continued

| value | type |
|---|---|
| [Last Name] | TEXTSTRING |

During filter evaluation, the first two tokens are pushed onto the evaluation stack:

| token array | evaluation stack |
|---|---|
| AND | [Last Name] |
| EQ | 'A' |
| 'Boston' | |
| [City] | |
| STARTS_WITH | |

Next, the operator STARTS WITH is encountered. Therefore, two operands are popped from the evaluation stack and evaluated using the operator. The result of this evaluation (e.g. TRUE) is pushed back onto the evaluation stack:

| token array | evaluation stack |
|---|---|
| AND | TRUE |
| EQ | |
| 'Boston' | |
| [City] | |

Two more operands from token array are pushed onto the evaluation stack:

| token array | evaluation stack |
|---|---|
| AND | TRUE |
| EQ | [City] |
| | 'Boston' |

The operator EQ is next encountered. Therefore, two operands are popped from the evaluation stack and evaluated using the operator. The result of this evaluation (e.g. TRUE) is then pushed onto the evaluation stack.

| token array | evaluation stack |
|---|---|
| AND | TRUE |
| | TRUE |

Finally, the remaining operator AND is encountered in the filter token array. Two operands are popped from the evaluation stack and evaluated using the operator. The result of this evaluation (i.e. TRUE) is also pushed onto the evaluation stack. Because there are no more tokens in the filter token array, the remaining token on the evaluation stack is the final result of the filter evaluation. This final token indicates that the record being evaluated passes the filter.

As stated briefly above, synchronization program 100 applies a filter expression based the field list of the remote database to the local database. To do so, synchronization program 100 uses a field map to determine which field of the local database corresponds to a field of the remote database used in the filter expression. Field mapping is described in U.S. Pat. No. 5,392,390, incorporated by reference. Briefly, to synchronize records of two databases, it is essential to determine which field or fields of one database should be synchronized with which field or fields of the other database. To accomplish this, a field map is used which correlates the fields of the two databases to one another. It should be noted that not all fields of a database are mapped onto the other database and therefore such unmapped fields are not synchronized with the other database.

In the described embodiment, L_translator 5 uses a filter expression which is based on the field list of the remote database to filter the records of the local database. For every token in the filter token array that contains a field name, L_translator 5 uses the remote database to the local database field map to determine the corresponding field in the local database record being evaluated and pushes the content of that field onto the evaluation stack. It may be the case that the field in the filter expression is an unmapped field and therefore does not have counterpart in the local database record being evaluated. If that is the case, L_translator 5 marks the token and its corresponding operator and operand tokens with a SKIP_EVAL flag. During the evaluation phase if an operator token is marked with a SKIP_EVAL flag, L_translator 5 determines the result of that operation to be TRUE. (If the operation to be skipped is to return a NUMBER type value, L_translator 5 determines the result to be '0' or zero. L_translator 5 then marks the resulting token, and that token's corresponding operator token and other operand token, with a SKIP_EVAL flag.) L_translator 5 applies the filter to the record in this manner until a final result remains in the evaluation stack. In alternative embodiments, the filter expression may be based on the field list of the local database or the user may select the database on whose field list the filter expression is to be based.

As stated above, instead of the translator for the database to be filtered, the database manager application for that database may filter the records of that database. The translator for the database parses the filter expression into a set of instructions formatted for the Application Programmer Interface (API) of the database manager application. In that case, the database application manager transmits to synchronization program 100 only those records that pass the filter.

To determine whether the translator or the application will filter the records of a database, the modules of synchronization program 100 use two types of flags. First, as described above, Parameter Table Generator 3 sets a USE_FILTER flag if a filter is being used (FIG. 5, step 161). Second, each of translators 5 and 9 in turn set an appropriate flag, i.e. R_Application_Is_Filtering or L_Application_Is_Filtering, to indicate that the database manager application will apply the filter. If both the USE_FILTER and the R_Application_Is_Filtering (or L_Application_Is_Filtering) flags are set, the flags indicate the remote (or local) database manager application will apply the filter to its database.

Referring back to FIG. 4, after Parameter Table Generator 3 creates the parameter table, Control Module 2 of the Translation Engine 1 instructs synchronizer 15 to initialize itself (step 101). Synchronizer 15 in response creates the workspace data array 16. Control Module 2 of the Translation Engine 1 then instructs synchronizer 15 to load history file 19 into workspace 16 (step 102). History file 19 is a file that was saved at the end of last synchronization and contains records reflecting the records of the two databases at the end of the previous synchronization. Synchronizer 15 uses history file 19 during current synchronization to analyze the records of the local and remote database to determine the changes, additions, and deletions in each of two databases since the previous synchronization. Synchronizer 15, as result of this analysis, then can determine what additions, deletions, or updates need be made to synchronize the records of the two databases.

In various situations, synchronizer 15 does not load history file 19. For example, if no history file from a previous synchronization exists or if the user chooses to synchronize not using the history file, synchronizer 15 will not load history file 19. Additionally, the user may wish to use a filter expression that is different from the filter expression used in the previous synchronization (including using no filter expression during the current synchronization). In that case, if one of the database manager applications filtered its database, then synchronizer 15 does not load the stored history file. This is because when a database manager application filters the records of a database, the history file contains only those records which pass the previous filter and not necessarily the records necessary for performing a synchronization using the current filter. Obviously, in the case where a history file is not loaded, synchronizer 15 synchronizes the two databases without using a history file.

FIG. 11 is pseudocode for the steps taken by synchronizer 15 to load history file 19. For each Record in history file 19 (step 200), synchronizer 15 first loads the record (step 201) and then writes the loaded record into workspace 16 (step 202). Synchronizer 15 repeats these steps until all of the records of the history file are loaded into the workspace.

Referring back to FIG. 4, after the history file is loaded into the workspace, Control Module 2 instructs R_translator 13 to load the remote database records (step 103). FIG. 12 is pseudocode for the steps taken by R_translator 13 to load the remote database records. If the USE_FILTER flag is set but R_Application_Is_Filtering flag is not set (step 300) then R_reader module 11 will apply the filter to the records of the remote database. For each record of the remote database (step 301), R_reader module 11 of the R_translator first loads the record (step 302). R_reader module 11 applies the filter expression identified by the parameter Filter_Id to the loaded record (step 303). If the record passes the filter then R_reader module 11 marks the record as having passed the filter (step 304). If the record does not pass the filter then R_reader module 11 marks the record as having failed the filter (step 305). R_reader module 11 then sends the record to synchronizer 15 (step 306) and synchronizer 15 writes the loaded record into the workspace (step 307). Steps 302–307 are performed until all records of the remote database are loaded.

If the Use_Filter flag and R_Application_Is_Filtering flags are both set (step 309), then the remote database application will filter the loaded records. R_reader module 11 converts the filter expression into the format required by remote database application's API and sends the converted filter expression to the remote database application (step 310). R_reader module 11 then loads the filtered records (step 311). If a record that was loaded passes the current filter expression, then R_reader module 11 marks that as having passed the filter; otherwise, R_reader module marks the record as having failed the filter (step 312). Since only those records that have passed the filter are loaded, R_reader module 11 does not mark any of the loaded records as having failed the filter. R_reader module 11 then sends the loaded records to synchronizer 15 (step 313) and synchronizer 15 writes the loaded records into the workspace (step 314).

Following loading the remote database records, Control Module 2 instructs L_sanitizer module 8 of L_translator 5 to sanitize the remote database records in the workspace (step 104).

Control Module 2 of the Translation Engine 1 then instructs the L_translator 5 to load the records from the local database (step 105). L_translator 5 and synchronizer 15 load records of the local database in the same manner as described for R_translator 9 in reference to FIG. 12, except for two differences. First, as described above, L_translator 5 filters the records of the local databases using the remote database to local database field map. It should be noted that the field maps are contained within the parameter table and the contents of the parameter table are transmitted to L_translator as read-only data. Second, as synchronizer 15 receives each local database record from the L_reader module 7 of the L_translator 5, synchronizer 15 maps that record using the local database to remote database map before writing the record into the next available spot in the workspace. This is due to the fact that, in the described embodiment, records in the workspace are stored according to the remote database data structure.

Referring back to FIG. 4, after all records are loaded into the workspace, Control Module 2 instructs synchronizer 15 to perform a Conflict Analysis and Resolution ("CAAR") procedure on the records in the workspace, which procedure is described in detail in the '490, '926 and '645 applications (step 107). Briefly, referring to FIG. 13, synchronizer 15 processes the records in the workspace, including comparing them to one another, in order to form them into groups of related records called corresponding item groups (CIGs). Synchronizer 15 forms the CIGs as it loads the records into the workspace and completes the process as the first step in CAAR (step 350). Each CIG may include at most one record from each of the databases and the history file. Each record in a CIG may be a recurring or a nonrecurring records. Where a database does not support recurring records, in the case of a recurring event, a CIG would contain related nonrecurring records from that database which together represent that recurring event. Based on this group of nonrecurring records, synchronizer 15 may create a model recurring record for use during the synchronization and include that model recurring record in the CIG. Hereinafter, when referring to a "record" in a CIG, we also intend to refer to such a group of related nonrecurring records in the CIG.

For each CIG (step 351), synchronizer 15 then compares the records in the CIG to one another, determines their differences, and decides what synchronization action should be taken (step 352). In essence, synchronizer 15 determines which record in the CIG contains the most current data. Synchronizer 15 then determine what synchronization action should be taken to conform the other records in the CIG to the record with the most current data (i.e. how the other records in the CIG should be changed). Synchronization actions with respect to a record include updating, deleting, adding, or not modifying that record.

We will now provide some examples of the results obtained in the CAAR analysis. If after comparing the records in a CIG, synchronizer 15 determines that the record from the local database is unchanged and the one from remote database is changed, synchronizer 15 determines that the local database record should be changed to conform to the remote database record. Or, if both records are changed (an example of what we refer to as a "conflict" since there is no clear choice of synchronization action), synchronizer 15 may use a user-selected rule to decide what synchronization should be taken. The rule may require, for example, not modifying either of the records, changing the remote database record to conform to the local database record, or asking the user to resolve conflicts.

In the described embodiment, when a filter expression is used during the synchronization, synchronizer 15 alters the synchronization outcome in at least three cases. First, if the synchronization outcome is that a conflict exists (step 354), synchronizer 15 determines whether one of the records fails the current filter. If one of the records in the CIG fails the filter, then synchronizer 15 marks all records in the CIG so that they are not updated (step 355). In other embodiments, synchronizer may use the user-selected rule for resolving conflicts to resolve the conflict. If one of the records in the CIG does not fail the filter, then synchronizer 15 uses the user-selected rule to resolve the conflict (step 356).

Second, as stated above, synchronizer 15 changes the content of all records in a CIG to that of the record with the most up to date data. Therefore, if the record that contains the most up to date data fails the current filter, then the other records in the CIG when updated will also fail the filter. To resolve this issue, in the described embodiment, instead of updating the records in the CIG, all records in that CIG are marked as having failed filter (step 358). Therefore, the records are not updated when unloaded to the databases at the end of synchronization, as will be described below.

Third, the filter expression may contain a filter condition based on an unmapped remote database field. As described above, when applying such a filter to the local database records, the local translator evaluates the filter condition containing the unmapped field as having a TRUE value. In that case, some filtered local database records may be marked as having passed the filter while their corresponding remote database records may be marked as having failed the filter, even though the mapped fields of both records may contain the same data. In the described embodiment, if a such a filter expression is used and one of the records in a CIG is marked as having failed the current filter, then synchronizer 15 marks all of the CIG records as failing the filter (step 359).

As stated above, in some cases, one of the databases may support recurring records while the other database may not. Therefore, a recurring record is fanned into a number of non-recurring records before being unloaded to the database that does not support recurring records. In such a situation, during CAAR, synchronizer 15 examines each recurring record to determine whether there are some fanned nonrecurring records which pass the value of the dynamic filter expression during the previous synchronization but fail the current value of the filter. If so, then the dynamic filter has changed in such a way that part of the set of fanned records fall outside of the current filter. In the described embodiment, in such a situation, synchronizer 15 determines that the recurring record should be fanned again to generate new fanned nonrecurring records and previously fanned nonrecurring records should be deleted. To accomplish this, synchronizer 15 flags the recurring record and the appropriate translator fans the recurring record into the appropriate database and deletes the previous instances (step 360).

When synchronizer 15 finishes performing CAAR on the records, synchronizer 15 would have determined what synchronization action should be taken with respect all records to be synchronized. The records may then be unloaded into their respective databases. The translators will perform the specific synchronization actions to be taken with respect to the records of the databases. However, prior to doing so, the user is asked to confirm proceeding with unloading (FIG. 4, steps 108–109). Up to this point, neither the databases nor the history file have been modified. The user may obtain through the Translation Engine's User Interface various information regarding what synchronization actions will be taken upon unloading.

If the user chooses to proceed with synchronization and to unload, the records are then unloaded. The unloader modules 6,10 of the translators 5,9 perform the unloading for the databases. During unloading, translators may use the filter expression to limit the data that is unloaded to the databases. For example, the translators may unload only those records which fall within the filter expression and delete any record which falls outside of the filter expression. During unloading, synchronizer 15 also creates the history file and unloads the records into the history file. We will now describe the unloading of the records into the databases and the history file in detail.

Control Module 2 of Translation Engine 1 first instructs R_translator 9 to unload remote database records from workspace into the remote database (FIG. 4, step 110). FIG. 14 is pseudocode for the steps taken by R_translator 9 to unload the records. For each remote database record in the workspace (step 400), R_translator 9 first determines whether the Use_Filter is set and the filter is a static filter (step 401). If that is the case, R_translator 9 determines whether the record passes or fails the filter. (It should be noted that, as described above, some records are marked as failing the filter during CAAR. In that case, during unloading, those records are considered to fail the filter.)

If the record fails the filter, R_translator 9 deletes the record from the remote database. If the record is passes the filter, then R_translator 9 adds, deletes, or modifies the record according to results of synchronization obtained during CAAR analysis (step 404). If the remote database does not support recurring records or in other circumstances described in detail in the '490, '926 and '645 applications, R_translator 9 in step 404 may fan a recurring record by creating an appropriate number of nonrecurring records corresponding to the recurring record. If, as described above, synchronizer 15 during CAAR marks a recurring record for re-fanning (FIG. 13, step 360), R_translator 9 in this step will re-fan the record. When fanning, the number of nonrecurring records would be limited by any date based filters (i.e. any date range) or other filters, so that nonrecurring records falling outside the filter are not created. Additionally, if a user has selected to limit the number of fanned nonrecurring records for each recurring record, R_translator would create only a limited number of instances, as described in more detail in the '490, '926 and '645 applications.

If the Use_Filter is not set or the filter is not a static filter (step 401), R_translator 9 determines whether the Use-Filter flag is set and the filter is a dynamic filter (step 405). If the Use-Filter flag is set and the filter is a dynamic filter, then R_translator 9 determines whether the record to be unloaded passes or fails the current filter. If the record does not pass the current filter (step 406) then the record is deleted on the remote database (step 407). If the record passes the current filter, then R_translator 9, in the same manner as step 404, adds, deletes, or modifies the record according to results of synchronization obtained during CAAR analysis (step 408).

By deleting records which fail the filter expression in steps 403 and 407, R_translator 9 uses the filter to limit the size of the remote database. If the remote database is located on a handheld computer, R_translator manages the memory of the handheld device by limiting the size of the database stored on the handheld computer.

Following unloading of the remote database records, Control Module 2 instructs the L_translator to unload the local database records from the workspace (FIG. 4, step 111). FIG. 15 is pseudocode for the steps taken by L_translator 5 to unload the local database records in the workspace. The steps 450–452, 454–455, 458–460 are respectively the same as steps 400–402, 404–405, and 408–410 in FIG. 14, described in detail above. Unlike R_translator 9, L_translator 5 does not delete records falling outside of the filter. Therefore, in step 453, if the filter is a static filter and the record does not fit the filter, then L_translator 5 modifies (i.e updates) the record if that is the synchronization result obtained during the CAAR analysis. However, synchronizer 15 does not add or delete a record, if that is synchronization result obtained during the CAAR analysis. In step 456, similarly, if the record is within the loading filter, then L translator 5 modifies the record if that is the synchronization result obtained during the CAAR analysis (step 457). In this manner, L_translator 5 propagates to the records of the local database changes to those remote database records which do not fit the current filter expression. It should be noted that such remote database records are deleted from the remote database (step 407, FIG. 14) since those remote database records fail the current filter. Also, during unloading, the unloader module of the L_translator uses the remote database to local database map to map the records in the workspace back into the format of local database records.

Additionally, it should be noted that where the local database manager application filters the local database, the local database manager application only provides those records which pass the loading filter. Therefore, the effect of step 457 is to update those records which passed the previous value of the filter expression but fail the current value of the filter expression.

It should be noted that in other embodiments, translators for the local and remote databases may use the filter expression during unloading in different manner than in the above described embodiments. For example, the remote translator may be configured in a similar manner as the local translator described above. Or, either the remote or local translator may only update records within the filter and leave completely unaffected records outside the filter. A translator may also add new records from one database to another, if those records fall outside of the current filter but are within the loading filter.

Control Module 2 next instructs synchronizer 15 to create a new history file (step 112). The process of creating a history file is described in detail in the '490, '926 and '645 applications. Briefly, for each CIG, synchronizer 15 during the CAAR process determines which one of the records in the CIG should be saved as the history file record. Based on these results, synchronizer 15 creates a history file. Synchronizer 15 also stores with each history file record the PASSED_FILTER/FAILED_FILTER flag based on whether the record passes or fails the current filter. Synchronizer also stores the value which determined the value of the dynamic filter for the current synchronization (e.g. the date of the current synchronization in the case of a dynamic date range filter).

At this point Synchronization is complete.

Other embodiments are within the following claims.

For example, if one of the databases has the capability to provide database generated information or data which can be used to determine, for example, whether a record has been changed, added, or deleted since a previous synchronization, the synchronization program uses that information to determine whether a record has been changed, added, or deleted. Of course, that database generated information is less than the whole record of the database. For example, that information may be a date and time stamp, or a flag, set when the record was last modified or when the record was added, whichever is later. We will briefly describe an embodiment of such a synchronization program, which is described in detail in the commonly assigned copending U.S. patent application, incorporated by reference in its entirety, entitled "Synchronization of Databases," filed on Nov. 5, 1997, Ser. No. 08/964,751 (hereinafter, the "'751 application").

There are generally two types of such databases: "medium synchronization" and "fast synchronization" databases. A "fast synchronization" database is a database which provides information regarding changes, deletions, and additions to its records from one synchronization to the next. A fast synchronization database also assigns to each record of the database a unique identification code (i.e. a unique ID) which uniquely identifies that record. Unique IDs are required to accurately identify records over a period of time. A fast synchronization database also provides a mechanism for keeping track of which records are added, changed, or deleted from synchronization to synchronization, including a list of deleted records.

A "medium synchronization" database typically has more limited capabilities than a fast synchronization database for keeping track of addition, deletions, or changes. In short, a medium synchronization database does not keep track of deletions. Such a database however still has the capability to provide information regarding what records were added or modified since a previous synchronization. A medium synchronization database also provides unique IDs.

If the information provided by a database indicates that a record has not been changed or added since a previous synchronization, the synchronization program need not load that record and can use the history file to reconstruct the relevant contents of that record for synchronizing the two databases. The history file contains a copy of the relevant content of that record as the record was at the time of (e.g. at the end of) the previous synchronization. Using the history file to reconstruct the record instead of loading the record can result in significant saving of time—where for example the data transfer link between the two computers is slow—since typically a majority of records in databases are unchanged records. The synchronization program thereby increases the efficiency of performing synchronization between two databases.

The synchronization program does not synchronize a record of the fast or medium synchronization database that fails the filter expression with the records of the other database. Therefore, the synchronization program does not reconstruct those unchanged records which fail the filter expression. However, the synchronization reconstructs unchanged records of the fast or medium synchronization database which failed the filter during the last synchronization but pass the current filter. In that case, since the records previously failed the filter, the records would not be in the other database. After reconstructing these unchanged records, the synchronization program treats these records as if these records were newly added to the fast or medium synchronization database and therefore adds these record to the other database.

As is apparent, when synchronizing a fast or medium synchronization database, the synchronization program may use the history file to reconstruct unchanged records, whether those unchanged records fail or pass the current filter. Therefore, the synchronization program at the end of each synchronization ensures that the records of the history file are synchronized with the records of the fast or medium synchronization database. In essence, the synchronization program ensures that the history file contains records which represent all of the records of the fast or medium synchronization at the end of the current synchronization, whether the records pass or fail the current filter. Since, as described above, some records of the fast or medium synchronization database are not present in the other database, the history file contains some records that are present only in the fast or medium synchronization database but not in the other database.

Where the database manager application of a fast or medium synchronization database filters the records of the database, the synchronization program does not receive those records of the database which fail the filter. Therefore, if the filter changes such that some of the unchanged records which were previously outside of the filter are now within the filter, the synchronization program can not rely on the history file. In that case, the synchronization program loads all records of the database and proceeds to synchronize without using the history file.

In some embodiments, both computers on which the two databases run are capable of running programs other than a database, as in the case of, for example, general purpose computers such as desktop and notebook computers, or handheld computers having sufficient memory and processing power. In such a case, the synchronization program may be distributed between the two computers so as to, for example, increase the efficiency of using of a slow data transfer link between the two machines. We will briefly describe an embodiment of such a distributed synchronization program, which is described in detail in the commonly assigned copending U.S. patent application, incorporated herein in its entirety by reference, entitled "Distributed Synchronization of Databases", filed on Sep. 11, 1997, Ser. No. 08/927,922 (hereinafter, the "'922 application").

Figure 16:
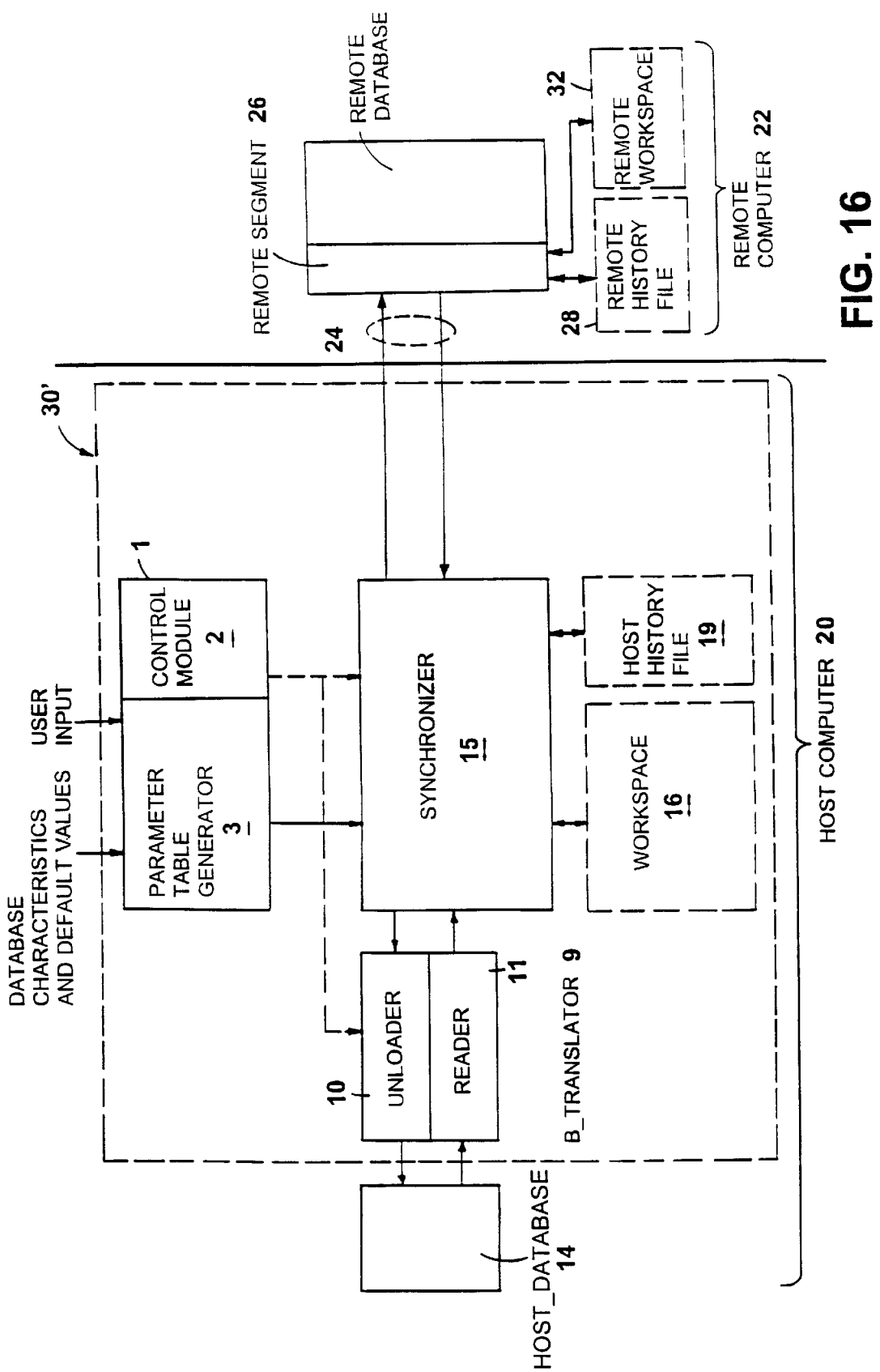
FIG. 16 is a schematic drawing of the various modules constituting an embodiment of a distributed synchronization program.

Briefly, referring to FIG. 16, at remote computer 22, remote segment 26 of the synchronization program loads records of remote database 13. Remote segment 26 then determines which records of the remote database have been changed/added, deleted or left unchanged since a previous synchronization. If the remote database assigns unique identification codes (i.e. unique ID) to its records, remote segment 26 can further differentiate between records than have been added and those than have been changed since the previous synchronization. Remote segment 26 uses a remote history file 30 which stores data representing or reflecting the records of the database at the completion of the previous synchronization. This data may be a copy of remote database 13. It may also be hash numbers for each of the records of the remote database. If the remote database assigns unique IDs, the remote history file may contain those unique IDs together with the hash numbers of the records corresponding to the stored unique IDs.

Remote segment 26 sends those records of the remote database that have been changed or added to the host segment or the host computer. However, the remote segment does not send the unchanged or deleted records to the host computer. Instead, the remote segment sends a flag indicating the status of the record (e.g. unchanged or changed) and some data or information that uniquely identifies the record to the host segment. This data or information may be a hash number of all or selected fields in the record at the completion of the last synchronization. It may also be the unique ID assigned to the record by the remote database, if the database assigns one to its records.

Host segment 28 uses the received information or data that uniquely identifies the unchanged record to access a record in host history file 19 that corresponds to the received information or data. This record contains a copy of the data of the remote database record that the remote segment found to have been unchanged. Host segment 19 then uses this record to synchronize the databases in the same manner as described above. After synchronization, the remote and host history files are updated. Also, the records are unloaded to the remote and local database based on the filter expression, in the same manner as described above. Since the unchanged records which typically constitute most of the records of a database are not transferred to the host computer, a data transfer link, specially a slow data transfer link, is used with increased efficiency.

In such a distributed synchronization program, the remote and host segments would apply the filter expression to the records of the databases. In the case of the host segment, the process would be similar to that for the above described embodiments. In the case of the remote database, along with information identifying the record or the record's field values, remote segment 26 sends the host segment information indicating that the record passed or failed the filter. The synchronization process then proceeds as for the previously described embodiments. During unloading, the host segment sends the remote segment information with respect whether the records passed or failed the filter expression, along with the result of CAAR. Remote segment 26 then uses this information and the filter expressions, in the same manner as the above described translators when unloading records to the remote database.

In some embodiments, two or more databases on one computer may be synchronized with one database on the other computer. For example, it may be that the remote database application supports only one name and address database while the local database application supports two name and address databases. To synchronize the multiple local databases with the single remote database, one of the local databases is designated as the main local database for synchronization with the remote database. During synchronization, as synchronization program 100 adds records from the local databases to the remote database, synchronization program tags the added records with codes (i.e. origin tags) identifying the source of the database record, e.g. the first local database, the second local database, etc. Synchronization program 100 uses these tags during future synchronizations to ensure that the tagged records are synchronized with the correct database, i.e. the database from which they originated. Additionally, during synchronization, synchronization adds new records from the remote database only to the local database which was designated as the main database. This method of synchronization is described in detail the '490, '926 and '645 applications.

To enable filtering the records during synchronization, synchronization program 100 uses the origin tags of the records to ensure that the correct filter is applied to the correct records. For example, consider the case where two local databases are synchronized with a single remote database. Each of the local databases may have a unique filter. Or one database may have a filter and the other may not. When synchronization program 100 is synchronizing the local databases with the remote database, synchronization program 100 uses the origin tags of the remote database records to determine which filter should be applied to each record. If the origin tag of a remote database record indicates that it originated from the first database, then the filter expression for that database, if any, is used. Similarly, if the origin tag of a remote database record indicates that it originated from the second database, then the filter expression for that database, if any, is used. Additionally, if a remote database record is new (i.e. newly added since the previous synchronization), the filter expression for the local database that was designated as the main local database is used. It should be noted that while this method of synchronization was described for synchronizing a single remote database with multiple local database, same method may be used for synchronizing multiple remote databases with a single local database, or multiple remote databases with multiple local databases.

It should be noted that the synchronization process in the above embodiments was described primarily in reference to using a filter during synchronization. If a user chooses not to use a filter, the synchronization proceeds generally in the manner described the '751, '922, '490, '926 and '645 applications.

What is claimed is:

1. A computer implemented method of synchronizing at least a first and a second personal information management database wherein the records of at least the first database include a text field, the method comprising:

using a filter to select a plurality of records of the first database, the filter comprising one or more user definable conditions or criteria that a record must match or fit to be selected, wherein the conditions or criteria include a user definable text criterion, and selecting the plurality records of the first database includes comparing the text field with the text criterion; and synchronizing the selected records of the first database with records of the second database, the synchronizing comprising adding, modifying, or deleting records, whereby synchronization is performed for a subset of the records of the databases.

2. The method of claim 1 wherein records representative of the records of one of the first and second databases during a prior synchronization are stored in a history file, and wherein synchronizing the at least one of the selected records of the first database with a record of the second database further includes using the history file.

3. The method of claim 1 further comprising selecting records of the first database based on a selected criterion, wherein synchronizing the at least one of the selected records of the first database with a record of the second database further includes synchronizing the at least one of the selected records of the first database with at least one of the selected records the second database.

4. The method of claim 1 wherein records of the first database include a number field and the conditions criteria include a number criterion, and selecting the plurality records of the first database includes comparing the number field with the number criterion.

5. The method of claim 1 wherein records of the first database include a date field and the conditions or criteria include a date criterion, and selecting the plurality records of the first database includes comparing the date field with the date criterion.

6. The method of claim 1 wherein records of the first database include a boolean field and the conditions or criteria include a boolean criterion, and selecting the plurality records of the first database includes comparing the boolean field with the boolean criterion.

7. The method of claim 1 wherein records of the first database include a time field and the conditions or criteria include a time criterion, and selecting the plurality records of the first database includes comparing the time field with the time criterion.

8. The method of claim 1 wherein a selected plurality of the fields of the records of the first database are mapped onto a selected plurality of corresponding fields of the records of the second database and using a filter to select a plurality of records of the first database includes determining whether contents of a field of the records of the first database fit the one or more conditions or criteria wherein the field of the records of the first database is not mapped onto a corresponding field of the records of second database.

9. The method of claim 1 wherein the first database is located on a first computer and the second database located on a second computer, the method further comprising:

determining, at the first computer, whether a record of the first database has been changed or added since a previous synchronization, using a first history file located on the first computer comprising records representative of records of the first database at the completion of the previous synchronization;

if the record of the first database has not been changed or added since the previous synchronization, sending from the first computer to the second computer information which the second computer uses to select the record of the first database to be unchanged.

10. The method of claim 9 wherein selecting the plurality of records of the first database is performed at the first computer.

11. The method of claim 9 wherein selecting the plurality of records of the first database is performed at the second computer.

12. The method of claim 1 further comprising:

determining whether the records of the first database have been changed or added since the previous synchronization, based on data reflecting whether the records of the first database have been added or changed since a previous synchronization;

if one of the records of the first database has not been changed or added since the previous synchronization, performing a synchronization with records of the second database using a record representative of the one record at the time of a previous synchronization, the representative record being stored in a history file containing records reflecting the contents of records of the first database at the time of a previous synchronization.

13. The method of claim 12 wherein the history file contains at least one record representative of at least one record of the first database failing to fit the one or more conditions or criteria at the time of the previous synchronization and failing to be synchronized with the records of the second database at the time of the previous synchronization.

14. The method of claim 1 further comprising:

deleting a second plurality of the records of the first database failing to fit the conditions or criteria.

15. The method of claim 14 fixer comprising:

updating a plurality of records of the second database failing to fit the current value of the conditions or criteria.

16. The method of claim 1 wherein the conditions or criteria has a current value during a current synchronization being different from a previous value during a previous synchronization, further comprising:

updating a plurality of records of the second database, based on results of the synchronization, wherein the plurality of records of the second database fit the previous value of the conditions or criteria but fail to fit the current value of the conditions or criteria.

17. The method of claim 1 further comprising synchronizing a third database with one of the first and second databases.

18. The method of claim 17 wherein synchronizing the third database with one of the first and second databases includes:
   selecting a plurality of records of a third database fitting second conditions or criteria; and
   synchronizing at least one of the identified records of the third database with a second record of the one of the first and second databases.

19. The method of claim 18 wherein the first-mentioned conditions or criteria and the second conditions or criteria are the same.

20. The method of claim 18 wherein the second record of the one of the first and second databases includes a code identifying the second record as having originated from the third database.

21. The method of claim 1 further comprising displaying a record selection criteria input region on a computer display for a user to input a record selection criteria that specifies the conditions or criteria.

22. The method of claim 21 further comprising:
   transmitting the record selection criteria to a database manager, wherein the database manager manages the first database, and using the record selection criteria to select records of the first database fitting the conditions or criteria.

23. The method of claim 1, wherein the first and second databases are different copies of the personal information management database of the same individual.

24. The method of claim 23, wherein the personal information management database includes a schedule database.

25. The method of claim 1, wherein the first and second databases are located on different computers and at least one of the computers is a handheld computer.

26. The method of claim 25, wherein the handheld computer has less storage capacity than the other computer, wherein fewer records are stored in the database on the handheld computer than in the database on the other computer, and wherein the filter is used to limit the number of records added to the database on the handheld computer during a synchronization.

27. A computer program, resident on a computer readable medium, for synchronizing at least a first and a second personal information management database wherein the records of at least the first database include a text field, comprising instructions for:
   using a filter to select a plurality of records of the first database,
   the filter comprising one or more user definable conditions or criteria that a record must match or fit to be selected, wherein the conditions or criteria include a user definable text criterion, and selecting the plurality records of the first database includes comparing the text field with the text criterion; and
   synchronizing the selected records of the first database with records of the second database,
   the synchronizing comprising adding, modifying, or deleting records,
   whereby synchronization is performed for a subset of the records of the databases.

28. The computer program of claim 27 wherein records representative of the records of the first and second databases during a prior synchronization are stored in a history file, and wherein synchronizing the at least one of the selected records of the first database with a record of the second database further includes using the history file.

29. The computer program of claim 27 further comprising instructions for selecting records of the first database based on a selected criterion, wherein synchronizing the at least one of the selected records of the first database with a record of the second database further includes synchronizing the at least one of the selected records of the first database with at least one of the selected records the second database.

30. The computer program of claim 27 wherein records of the first database include a number field and the conditions or criteria include a number criterion, and selecting the plurality records of the first database includes comparing the number field with the number criterion.

31. The computer program of claim 27 wherein records of the first database include a date field and the conditions or criteria include a date criterion, and selecting the plurality records of the first database includes comparing the date field with the date criterion.

32. The computer program of claim 27 wherein records of the first database include a boolean field and the conditions or criteria a include a boolean criterion, and selecting the plurality records of the first database includes comparing the boolean field with the boolean criterion.

33. The computer program of claim 27 wherein records of the first database include a time field and the conditions or criteria include a time criterion, and selecting the plurality records of the first database includes comparing the time field with the time criterion.

34. The computer program of claim 27 wherein a selected plurality of the fields of the records of the first database are mapped onto a selected plurality of corresponding fields of the records of the second database and using a filter to select a plurality of records of the first database includes determining whether contents of a field of the records of the first database fit one or more conditions or criteria, wherein the field of the records of the first database is not mapped onto a corresponding field of the records of second database.

35. The computer program of claim 27 wherein the first database is located on a first computer and the second database located on a second computer, the computer program further comprising instructions for:
   determining, at the first computer, whether a record of the first database has been changed or added since a previous synchronization, using a first history file located on the first computer comprising records representative of records of the first database at the completion of the previous synchronization;
   if the record of the first database has not been changed or added since the previous synchronization, sending from the first computer to the second computer information which the second computer uses to select the record of the first database to be unchanged.

36. The computer program of claim 35 wherein selecting the plurality of records of the first database is performed at the first computer.

37. The computer program of claim 35 wherein selecting the plurality of records of the first database is performed at the second computer.

38. The computer program of claim 27 further comprising instructions for:
   determining whether the records of the first database have been changed or added since the previous synchronization, based on data reflecting whether the records of the first database have been added or changed since a previous synchronization;

if one of the records of the first database has not been changed or added since the previous synchronization, performing a synchronization with records of the second database using a record representative of the one record at the time of a previous synchronization, the representative record being stored in a history file containing records reflecting the contents of records of the databases at the time of a previous synchronization.

39. The computer program of claim 38 wherein the history file contains at least one record representative of at least one record of the first database failing to fit the one or more conditions or criteria at the time of the previous synchronization and failing to be synchronized with the records of the second database at the time of the previous synchronization.

40. The computer program of claim 27 further comprising instructions for:

deleting a second plurality of the records of the first database failing to fit the conditions or criteria.

41. The computer program of claim 40 further comprising instructions for:

updating a plurality of records of the second database failing to fit the current value of the conditions or criteria.

42. The computer program of claim 27 wherein the conditions or criteria has a current value during a current synchronization being different from a previous value during a previous synchronization, further comprising instructions for:

updating a plurality of records of the second database, based on results of the synchronization, wherein the plurality of records of the second database fit the previous value of the conditions or criteria but fail to fit the current value of the conditions or criteria.

43. The computer program of claim 27 further comprising instructions for synchronizing a third database with one of the first and second databases.

44. The computer program of claim 43 wherein synchronizing the third database with one of the first and second databases includes instructions for:

selecting a plurality of records of a third database fitting second conditions or criteria; and synchronizing at least one of the identified records of the third database with a second record of the one of the first and second databases.

45. The computer program of claim 44 wherein the first-mentioned conditions or criteria and the second conditions or criteria are the same.

46. The computer program of claim 44 wherein the second record of the second database includes a code identifying the second record of the second database as having originated from the third database.

47. The computer program of claim 27 further comprising instructions for displaying a record selection criteria input region on a computer display for a user to input a record selection criteria that specifies the conditions or criteria.

48. The computer program of claim 47 further comprising instructions for:

transmitting the record selection criteria to a database manager, wherein the database manager manages the first database, and using the record selection criteria to select records of the first database fitting the conditions or criteria.

49. The computer program of claim 27, wherein the first and second databases are different copies of the personal information management database of the same individual.

50. The computer program of claim 49, wherein the personal information management database includes a schedule database.

51. The computer program of claim 27, wherein the first and second databases are located on different computers and at least one of the computers is a handheld computer.—

52. The method of claim 51, wherein the handheld computer has less storage capacity than the other computer, wherein fewer records are stored in the database on the handheld computer than in the database on the other computer, and wherein the filter is used to limit the number of records added to the database on the handleld computer during a synchronization.

* * * * *

UNITED STATES PATENT AND TRADEMARK OFFICE
CERTIFICATE OF CORRECTION

PATENT NO. : 6,212,529 B1
DATED : April 3, 2001
INVENTOR(S) : David J. Boothby, David W. Morgan and John R. Marien It is certified that error appears in the above-identified patent and that said Letters Patent is hereby corrected as shown below:

<u>Title page,</u>
Item [75], Inventors, "John R. Marien, Nashua" should read -- John R. Marien, Hollis --.
Item [57], ABSTRACT,
Line 6, after "criteria", insert -- input region may be --.
Item [56], References Cited, U.S. PATENT DOCUMENTS, "U.S. application no. 08/749926" should be -- U.S. application no. 08/749,926 --.

<u>Column 2,</u>
Line 33, after "records", insert -- of --.

<u>Column 8,</u>
Line 8, after "always", delete "the".

<u>Column 10,</u>
Line 8, after "similar", insert -- to --.

<u>Column 13,</u>
Line 19, "STARTS WITH" should be -- STARTS_WITH --.

<u>Column 18,</u>
Line 30, after "record", delete "is".

<u>Column 20,</u>
Line 61, "record" should be -- records --.

UNITED STATES PATENT AND TRADEMARK OFFICE
CERTIFICATE OF CORRECTION

PATENT NO.    : 6,212,529 B1
DATED         : April 3, 2001
INVENTOR(S)   : David J. Boothby, David W. Morgan and John R. Marien It is certified that error appears in the above-identified patent and that said Letters Patent is hereby corrected as shown below:

Column 23,
Line 18, after "described", insert -- in --.
Line 30, after "plurality", insert -- of --.
Line 50, after "records", insert -- of --.
Line 52, after "conditions", insert -- or --.

Column 24,
Line 58, "fixer" should be -- further --.

Column 26,
Line 11, after "records", insert -- of --.

Signed and Sealed this

Tenth Day of December, 2002

JAMES E. ROGAN
*Director of the United States Patent and Trademark Office*

(12) EX PARTE REEXAMINATION CERTIFICATE (5217th)
United States Patent
Boothby et al.

(10) Number: US 6,212,529 C1
(45) Certificate Issued: *Oct. 11, 2005

(54) SYNCHRONIZATION OF DATABASES USING FILTERS

(75) Inventors: David J. Boothby, Nashua, NH (US); David W. Morgan, Derry, NH (US); John R. Marien, Hollis, NH (US)

(73) Assignee: Pumatech, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Reexamination Request:
No. 90/006,569, Mar. 10, 2003

Reexamination Certificate for:
Patent No.: 6,212,529
Issued: Apr. 3, 2001
Appl. No.: 09/036,400
Filed: Mar. 5, 1998

Certificate of Correction issued Dec. 10, 2002.

Related U.S. Application Data

(63) Continuation-in-part of application No. 08/748,645, filed on Nov. 13, 1996, now Pat. No. 6,141,664.

(51) Int. Cl.[7] .......................... G06F 12/00; G06F 17/30
(52) U.S. Cl. ...................................... 707/201; 709/216
(58) Field of Search ...................... 707/6, 8, 10, 104.1, 707/201; 345/762

(56) References Cited

U.S. PATENT DOCUMENTS

| | | |
|---|---|---|
| 4,162,610 A | 7/1979 | Levine |
| 4,807,154 A | 2/1989 | Scully et al. |
| 4,807,155 A | 2/1989 | Cree et al. |
| 4,817,018 A | 3/1989 | Cree et al. |
| 4,819,191 A | 4/1989 | Scully et al. |
| 4,831,552 A | 5/1989 | Scully et al. |
| 4,939,689 A | 7/1990 | Davis et al. |
| 5,124,912 A | 6/1992 | Hotaling et al. |
| 5,134,564 A | 7/1992 | Dunn et al. |
| 5,197,000 A | 3/1993 | Vincent |
| 5,201,010 A | 4/1993 | Deaton et al. |
| 5,220,540 A | 6/1993 | Nishida et al. |
| 5,276,876 A | 1/1994 | Coleman et al. |
| 5,323,314 A | 6/1994 | Baber et al. |
| 5,327,555 A | 7/1994 | Anderson .................... 707/201 |
| 5,392,390 A | * 2/1995 | Crozier ....................... 345/762 |
| 5,412,801 A | 5/1995 | De Remer et al. |
| 5,421,012 A | 5/1995 | Khoyi et al. |
| 5,455,945 A | 10/1995 | VanderDrift |
| 5,530,853 A | 6/1996 | Schell et al. |
| 5,530,939 A | 6/1996 | Mansfield, Jr et al. |
| 5,557,518 A | 9/1996 | Rosen |
| 5,581,753 A | 12/1996 | Terry et al. |
| 5,581,754 A | 12/1996 | Terry et al. |
| 5,596,574 A | 1/1997 | Perlman et al. |

(Continued)

OTHER PUBLICATIONS

Extended Systems' Final Invalidity Contentions (Oct. 10, 2003).
Defendant and Cross–Complainant Extended Systems, Inc.'s Identification of Prior Art Publications Pursuant to Patent L.R. 3–3(a) (Oct. 17, 2003).
Defendant and Cross–Complainant Extended Systems, Inc.'s Amended Identification of Prior Art Publications Pursuant to Patent L.R. 3–3(a) (Oct. 31, 2003).
Expert Report of John P. J. Kelly, Ph.D. (Oct. 24, 2003).

(Continued)

Primary Examiner—Safet Metjahic

(57) ABSTRACT

A computer program is provided for synchronizing at least a first and a second database. A plurality of records of the first database fitting a selected criterion are identified. At least one of the identified records of the first database is then synchronized with a record of the second database. On a computer display, a record selection criteria input region may be displayed for a user to input the selected criterion.

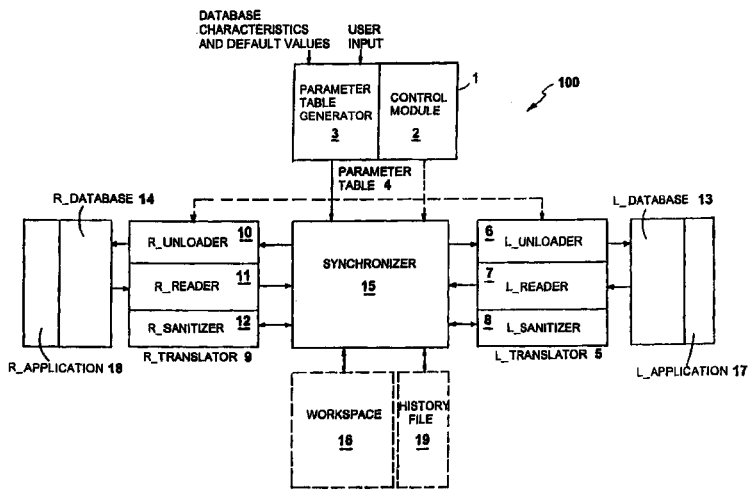

U.S. PATENT DOCUMENTS

| | | | |
|---|---|---|---|
| 5,608,865 A | * 3/1997 | Midgely et al. ............ 395/180 |
| 5,615,109 A | 3/1997 | Eder |
| 5,623,540 A | 4/1997 | Morrison et al. |
| 5,649,182 A | 7/1997 | Reitz |
| 5,659,741 A | * 8/1997 | Eberhardt ................ 707/104.1 |
| 5,666,530 A | 9/1997 | Clark et al. ................. 707/201 |
| 5,671,407 A | 9/1997 | Demers et al. |
| 5,689,706 A | 11/1997 | Rao et al. |
| 5,704,029 A | 12/1997 | Wright, Jr. |
| 5,706,452 A | 1/1998 | Ivanov |
| 5,706,509 A | 1/1998 | Man Hak Tso |
| 5,727,202 A | 3/1998 | Kucala ........................ 707/10 |
| 5,729,735 A | * 3/1998 | Meyering .................... 707/10 |
| 5,737,539 A | 4/1998 | Edelson et al. |
| 5,758,337 A | * 5/1998 | Hammond ..................... 707/6 |
| 5,781,908 A | 7/1998 | Williams et al. |
| 5,809,494 A | 9/1998 | Nguyen |
| 5,813,009 A | 9/1998 | Johnson et al. |
| 5,813,013 A | 9/1998 | Shakib et al. |
| 5,819,272 A | 10/1998 | Benson |
| 5,819,274 A | 10/1998 | Jackson, Jr. |
| 5,832,218 A | 11/1998 | Gibbs et al. |
| 5,832,489 A | 11/1998 | Kucala |
| 5,838,923 A | 11/1998 | Lee et al. |
| 5,857,201 A | 1/1999 | Wright, Jr. et al. ...... 707/104.1 |
| 5,875,242 A | 2/1999 | Glaser et al. |
| 5,877,760 A | 3/1999 | Onda et al. |
| 5,892,909 A | 4/1999 | Grasso et al. |
| 5,924,094 A | 7/1999 | Sutter |
| 5,926,816 A | * 7/1999 | Bauer et al. .................... 707/8 |
| 5,928,329 A | 7/1999 | Clark et al. |
| 5,943,676 A | 8/1999 | Boothby |
| 5,956,508 A | 9/1999 | Johnson et al. |
| 5,966,714 A | * 10/1999 | Huang et al. ............... 707/201 |
| 5,974,238 A | 10/1999 | Chase, Jr. |
| 5,995,980 A | 11/1999 | Olson et al. |
| 5,999,947 A | 12/1999 | Zollinger et al. |
| 6,018,303 A | 1/2000 | Sadeh |
| 6,044,381 A | 3/2000 | Boothby |
| 6,081,806 A | 6/2000 | Chang et al. |
| 6,098,078 A | 8/2000 | Gehani et al. |
| 6,125,369 A | 9/2000 | Wu et al. |
| 6,141,664 A | 10/2000 | Boothby |
| 6,212,221 B1 | 4/2001 | Wakayama et al. |
| 6,233,452 B1 | 5/2001 | Nishino |
| 6,272,074 B1 | 8/2001 | Winner |
| 6,324,542 B1 | 11/2001 | Wright, Jr. et al. |
| 6,330,568 B1 | 12/2001 | Boothby |
| 6,405,218 B1 | 6/2002 | Boothby |

OTHER PUBLICATIONS

IntelliLink for Windows User's Guide, Version 3.0, IntelliLink Corporation (1993).

Database Subsetting Tool: Introduction to DST and DST Designer's Guide, Syware, Inc. (1993).

Sarin, "Robust Application Design in Highly Available Distributed Databases," Proc. $5^{th}$ Symp. Reliability in Distributed Software and Database Systems, pp. 87–94 (Jan. 13–15, 1986, Los Angeles).

Distributed Management of Replicated Data: Final Report, Computer Corporation of America (Oct. 9, 1984).

Sarin et al., "Overview of SHARD: A System for Highly Available Replicated Data", Computer Corporation of America (Apr. 8, 1988).

SRI Int'l, Network Reconstitution Protocol, RADC–TR–87–38, Final Technical Report (Jun. 1987).

Danberg, "A Database Subsetting Tool" (patent application) (Apr. 12, 1993).

Lamb et al., "The Objectstore Database System," Communications of the ACM, vol. 34, No. 10, pp. 50–63 (Oct. 1991).

TT Interchange, Time Technology, AVG Sales & Marketing Ltd. (1995).

Goldberg et al., "Using Collaborative Filtering to Weave an Information Tapestry," Communications of the ACM, vol. 35, No. 12, pp. 61–70 (Dec. 1992).

Now Up–to–Date Version 2.0 User's Guide, Now Software, Inc. (1992).

An Introduction to DataPropagator Relational Version 1, IBM Corporation (1993).

Data Propagator Relational Guide Release 1, IBM Corporation (May 1994).

DataPropagator Relational Guide Release 2, IBM Corporation (Dec. 1994).

DataPropagator NonRelational MVS/ESA Version 2 Utilities Guide, IBM Corporation (Jul. 1994).

DPROPR Planning and Design Guide, IBM Corporation (Nov. 1996).

DataPropagator Relational Capture and Apply/400 Version 3, IBM Corporation (Jun. 1996).

DataPropagator Relational Capture and Apply for OS/400 Version 3, IBM Corporation (Nov. 1996).

Newton Connection Utilities User's Manual for the Macintosh Operating System, Apple Computer, Inc. (1996).

Newton Connection Utilities User's Manual for Windows, Apple Computer, Inc.

Newton Connection Utilities User's Manual for Macintosh, Apple Computer, Inc.

Newton Backup Utility User's Guide for the Windows Operating System, Apple Computer, Inc. (1995).

Newton Backup Utility User's Guide for the Macintosh Operating System, Apple Computer, Inc. (1995).

Newton Utilities User Manual, Apple Computer, Inc. (1995).

FileMaker Pro Server Administrator's Guide, Claris Corporation (1994).

Connectivity Pack User's Guide for the HP 200LX and the HP 100LX, Hewlett Packard.

Lotus cc:Mail Release 2, Lotus Development Corporation (1991–1993).

User's Guide Lotus Organizer Release 1.0, Lotus Development Corporation (1992).

FileMaker Pro User's Guide, Claris Corporation (1990, 1992).

Poesio et al., "Metric Constraints for Maintaining Appointments: Dates and Repeated Activities".

Slater, "Newton's Legacy; 3COM and Microsoft Battle for Market Share; Apple Newton, 3Com Palm III, Microsoft Palm–size PC peronal digital assistants; Product Information", Information Access Company (1998).

Negrino, "ACT 2.5.1, ACT for Newton 1.0", UMI, Inc. (1996).

Zilber, "Toy story; personal digital assistants; Product Information", Information Access Company (1996).

Wingfield, "Desktop to Newton connectivity", UMI, Inc. (1996).

"Now Software Announces Updated Synchronization Software for Newton 2.0 Devices; Now Synchronize Simultaneously Updates MessagePad, Now Up–to–Date & Contact", Business Wire, Inc. (1995).

"Claris Ships FileMaker Pro 3.0 for Macintosh and Windows", Business Wire, Inc. (1995).
Alsorp, "Distributed Thinking; Realizing the gravity of its PDA problems, Apple has drawn me back to Newton", InfoWorld Media Group (1995).
Rubin, "Now Software stays in sync; Now Synchronize file synchronization software for Macs and Newton PDAs; Software Review; EvaluationBrief Article", Information Access Company (1995).
"Now Calendar/Scheduler/Contact Mgr for Mac Update", Post–Newsweek Business Information Inc. (1995).
Staten, "csInStep middleware lets Newton talk to PIMs; Concierge Software LC's csInStep; Brief Article; Product Announcement; Brief Article", Information Access Company (1995).
Baum, "Designing Moble applications; A new approach needed for on–the–road systems", InfoWorld Media Group (1994).
Parkinson, "Remote users get in sync with office files; News Analysis", Information Access Company (1994).
Informix Guide to SQL Tutorial Version 7.1, Dec. 1994.
Oracle7 Distributed Database Technology and Symmetric Replication, Oracle White Paper, Apr. 1995.
Oracle7 Server Distributed Systems, vol. II: Replicated Data, Release 7.3, Feb. 1996.
Oracle7™ Server SQL Manual Release 7.3, Feb. 1996.
Extended Systems' Preliminary Invalidity Contentions.
Extended Systems' First Supplemental Preliminary Invalidity Contentions.
Extended Systems, Inc.'s Preliminary Claim Contructions and Preliminary Identification of Extrinsic Evidence.
Patent Local Rule 4–2 Preliminary Claim Constructions and Extrinsic Evidence.
Joint Claim Construction and Prehearing Statement.
Extended Systems' Second Supplemental Preliminary Invalidity Contentions [Re: Reexamination Requests for the '390, '664, and '529 Patents].
Pumatech, Inc.'s Opening Claim Construction Brief; Declaration of Marc David Peters in Support of Pumatech, Inc.'s Opening Claim Construction Brief.
Extended Systems, Inc.'s Responsive Claim Construction Brief; Declaration of Jordan Trent Jones in Support of Extended Systems, Inc.'s Responsive Claim Construction Brief.
Supplemental Decalaration of Marc David Peters in Support of Pumatech, Inc.'s Reply Claim Construction Brief.
Pumatech's Revised [Proposed] Claim Construction Order.
Pumatech, Inc.'s Reply Claim Construction Brief.
Statement of Recent Decision.
Pumatech's [Proposed] Claim Construction Order.
Synchrologic's Preliminary Invalidity Contentions.
Adly, "HARP: A Hierarchical Asynchronous Replication Protocol for Massively Replicated Systems," Computer Laboratory, Cambridge University, United Kingdom (undated).
Adly et al., "A Hierarchical Asynchronous Replication Protocol for Large Scale Systems," Computer Laboratory, Cambridge University, United Kingdom, Computer Science Department, Alexandria University, Egypt (undated).
Alexander, "Designed, sold, delivered, serviced," Computerworld Client/Server Journal, p. 43 (Oct. 1, 1995).
"All I need is a miracle; computer–aided educational packages; Small Wonders," Coastal Associates Publishing L.P. (Mar. 1992).

Alonso et al., "Database System Issues in Nomadic Computing," Matsushita Information Technology Laboratory, New Jersey (undated).
Badrinath et al., "Impact of Mobility on Distributed Computations," Operating Systems Review (Apr. 1, 1993).
Barbara et al., "Sleeper and Workaholics: Caching Strategies in Mobile Environments (Extended Version)" (Aug. 29, 1994).
Brandel, "New offerings fuel revival of PIM," Computerworld, p. 39 (Sep. 12, 1994).
Brodersen, "InfoPad—An Experiment in System Level Design and Integration," (Mar. 1, 1997).
Demers et al., "The Bayou Architecture: Support for Data Sharing Among Mobile Users," Computer Science Laboratory, Xerox Palo Alto Research Center, California (undated).
DeVoe et al., "SOFTWARE: Day–Timer Organizer 2.0 based on format of paper–based PIM," InfoWorld, vol. 17 (Aug. 21, 1995).
Froese, "File System Support for Weakly Connected Operation," pp. 229–238 (undated).
Greenberg et al., "Real Time Groupware as a Distributed System: Concurrency Control and its Effect on the Interface," Procs. of the ACM CSCW Conf. On Computer Supported Cooperative Work, Oct. 22–26, North Carolina, ACM Press (Jan. 1, 1994).
Guy, "Ficus: A Very Large Scale Reliable Distributed File System," Technical Report CSD–910018, Computer Science Dept. UCLA (Technical Report) (Jun. 3, 1991).
Guy et al., "Implementation of the Ficus Replicated File System," appeared in Procs. Of the Summer USENIX Conf., Anaheim, CA, pp. 63–71 (Jun. 1, 1990).
Haber, "Renegade PIMS," Computerworld, p. 109 (Dec. 12, 1994).
Hammer et al., "An Approach to Resolving Semantic Heterogeneity in a Federation of Autonomous, Heterogeneous Database Systems," Computer Science Department, University of Southern California (undated).
Hammer et al., "Object Discovery and Unification in Federated Database Systems," University of Southern California (undated).
HP and IntelliLink connect HP 95LX with HP NewWave; IntelliLink for the HP NewWave; product announcement, HP Professional (Aug. 1991).
"HP announces expanded memory version of palmtop PC, introduces 1–Megabyte HP 95LX and 1–Megabyte memory cards," Business Wire, Inc. (Mar. 4, 1992).
Huston et al., "Disconnected Operation of AFS," CITI Technical Report 93–3, Center for Information Technology Integration, University of Michigan (Jun. 18, 1993).
IBM Dictionary of Computing, Tenth Edition, 1993, pp. 268, 269, 31_.
IBM Dictionary of Computing, Tenth Edition, 1993, pp. 165, 268, 349, 370, 417.
IEEE Standard Dictionary of Electrical and Electronics Terms, Fourth Edition, 1988, p. 372, 368, 509, 563.
Imielinski, "Mobile Computing—DataMan Project Perspective," Rutgers University (undated).
"IntelliLink 2.2: the software connection from desktop to palmtop; Software Review; IntelliLink 2.2; Evaluation," PC Magazine (Apr. 28, 1992).
"IntelliLink transfers palmtop, PC data; communications software from IntelliLink Inc; brief article; Product Announcement," PC Week (Nov. 18, 1991).

Jacobs et al., "A Generalized Query–by–Example Data Manipulation Language Based on Database Logic," IEEE Transactions on Software Engineering, vol. SE–9, No. 1 (Jan. 1983).
Jenkins, "Users struggle with E–mail Woes," Computerworld, p. 97 (Oct. 24, 1994).
Johnson et al., "Hierarchical Matrix Timestamps for Scalable Update Propogation," submitted to the $10^{th}$ Int. Workshop on Distributed Algorithms (Jun. 25, 1996).
Joshi et al., "A Survey of Mobile Computing Technologies and Applications," (Oct. 29, 1995).
Kistler et al., "Disconnected Operation in the Coda File System," School of Computer Science, Carnegie Melon University, Pennsylvania (undated).
Krill, "NETWORKING: Tech Update," InfoWorld, vol. 18 (Feb. 12, 1996).
Kumar et al., "Log–Based Directory Resolution in the Coda File System," School of Computer Science, Carnegie Melon University, Pennsylvania (undated).
Larson et al., "A Theory of Attribute Equivalence in Databases with Application to Schema Integration," IEEE Transactions on Software Engineering, vol. 15, No. 4, Apr. 1989.
Lomet, D., Using timestamping to optimize two phase commit; Parallel and Distributed Information Systems, 1993, Proc. Of the $2^{nd}$ Int. Conf., Jan. 20–22, 1993, pp. 48–55.
Mannino et al., "Matching Techniques in Global Schema Design," IEEE 1984.
Marshall, "Product Reviews: Windows contact managers," InfoWorld, vol. 18 (Mar. 25, 1996).
McGoveran, "Distributed not yet delivered," Computerworld, p. 112 (Jun. 6, 1994).
Meckler Corporation, "Palmtop–to–desktop linkage software," Database Searcher (Jun. 1992).
Microsoft Press Computer Dictionary, Second Edition, 1994, p. 164.
Microsoft Press Computer Dictionary, Second Edition, 1994, pp. 105, 217, 227, 228.
Microsoft Press Computer Dictionary, Third Edition, 1997, pp. 194, 228, 234, 449.
Milliken, "Resource Coordination Objects: A State Distribution Mechanism," (DRAFT) (Dec. 10, 1993).
Nash, "Replication falls short," Computer world, p. 65 (Nov. 21, 1994).
Noble et al., "A Research Status Report for Adaptation for Mobile Data Access," School of Computer Science, Carnegie Melon University (undated).
"PackRat PIM gets older and wiser with Release 4.0; PIM update sports enhanced interface, greater ease of use," InfoWorld (Dec. 23, 1991).
"Palmtop PCs: power by the ounce; Hardware Review; overview of six evaluations of palm–top computers; includes related articles on Editor's Choices, suitability–to–task ratings, impression by individual users; evaluation," PC Magazine (Jul. 1991).
"Pen–based PCs ready for prime time; includes related article on comparison of operating systems, list of vendors of pen–based products," PC–Computing (Nov. 1991).
Perera, "Synchronization Schizophrenia," Computerworld Client/Server Journal, p. 50 (Oct. 1, 1995).
Petersen et al., "Bayou: Replicated Database Services for World–wide Applications," Computer Science Laboratory, Xerox Palo Alto Research Center, California (undated).
"Product comparison: Atari Portfolio, Casio Executive BOSS, HP 95LX, Poqet PC, Psion series 3, Sharp Wizard," InfoWorld (Dec. 16, 1991).

"Product Comparison: Personal information managers," InfoWorld, vol. 17 (Aug. 7, 1995).
Qu et al., Technical Report entitled "Mobile File Filtering," TR–CS–97–02–Australian National University (Feb. 1, 1997).
Radosevich, "Replication mania," Computerworld Client/Server Journal, p. 53 (Oct. 1, 1995).
Ratner et al., "The Ward Model: A Replication Architecture for Mobile Environments," Department of Computer Science, University of California (undated).
Reiher et al., "Peer–to–Peer Reconciliation Based Replication for Mobile Computers," UCLA (undated).
Reiher et al., "Resolving File Conflicts in the Ficus File System," Department of Computer Science, University of California (undated).
Ricciuti, "Object database server," InfoWorld, vol. 18 (Jan. 29, 1996).
"Riding the NewWave from PC to Palmtop: IntelliLink lets NewWave users transfer files," InfoWorld (Jun. 3, 1991).
Saltor et al., "Suitability of data models as canonical models for federated databases," Universitat Politecnica de Catalunya, Spain (undated).
Salzberg, B., Timestamping After Commit, Procs. Of the Third Int. Conf. On Parallel Distributed Information Systems, Sep. 28–30, 1994, pp. 160–167.
Satyanarayanan, "Coda: A Highly Available File System for a Distributed Workstation Environment," School of Computer Science, Carnegie Mellon University (undated).
Satyanarayanan, "Fundamental Challenges in Mobile Computing," School of Computer Science, Carnegie Mellon University (undated).
Satyanarayanan, "Mobile Information Access," IEEE Personal Communications, vol. 3, No. 1 (Feb. 1996).
Sherman, "Information Technology: 'What Software Should I Use to Organize My Life'," (undated).
Sheth et al., "A Tool for Integrating Conceptual Schemas and User Views," IEEE 1988.
Schilit et al., "The ParcTab Mobile Computing System," Xerox Palo Alto Research Center, California (undated).
SPI Database Software Technologies Record Displays: Record 2, Serial No. TDB0291.0094 and Record 4, Serial No. iets0901.0073 (undated).
Staten, "PowerMerge 2.0 ships; syncs moved filed," MacWEEK, vol. 8, p. 38(1) (Jan. 3, 1994).
Tait, Doctoral Thesis entitled "A File System for Mobile Computing," (Jan. 1, 1993).
Tolly, "Enhanced Notes 4.0 gets thumbs–up," Computerworld, p. 54 (Dec. 18, 1995).
Webster's Ninth New Collegiate Dictionary, 1986, pp. 114, 436, 440, 462, 573, 597, 620, 717, 906, 963, 979, 989, 1000, 1053, 1130, 1142, 1152, 1162, 1166.
Wiederhold, Gio, Database Design, Second Edition, McGraw–Hill Book Company, 1983, p. 2.
Zaino, "Tapping the Top Values in PDAs—Personal digital assistants that sell for as little as $300 can put a PC in the palm of your hand. Get the scoop on 8 contenders," HomePC, p. 97 (Oct. 1, 1996).
Zisman et al., "Towards Inoperability in Heterogeneous Database Systems," Imperial College Research Report No. DOC 95/11 (Dec. 1, 1995).

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2, 12, 14, 15, 21, 25–28, 38, 40, 41, 47, 51 and 52 is confirmed.

Claims 4–11, 13, 16–20, 22–24, 30–37, 39, 42–46 and 48–50 are cancelled.

Claims 3 and 29 are determined to be patentable as amended.

3. The method of claim 1 further comprising selecting records of the [first] *second* database based on a selected criterion, wherein synchronizing the at least one of the selected records of the first database with a record of the second database further includes synchronizing the at least one of the selected records of the first database with at least one of the selected records *of* the second database.

29. The computer program of claim 27 further comprising instructions for selecting records of the [first] *second* database based on a selected criterion, wherein synchronizing the at least one of the selected records of the first database with a record of the second database further includes synchronizing the at least one of the selected records of the first database with at least one of the selected records *of* the second database.

* * * * *